(12) United States Patent
Vinod et al.

(10) Patent No.: US 12,393,191 B2
(45) Date of Patent: Aug. 19, 2025

(54) CONTROLLING SEARCH AGENTS TO PERFORM SEARCH WITH NOISY OBSERVATIONS AND PROBABILISTIC GUARANTEES

(71) Applicant: Mitsubishi Electric Research Laboratories, Inc., Cambridge, MA (US)

(72) Inventors: Abraham Vinod, Cambridge, MA (US); Stefano Di Cairano, Newton, MA (US); Parth Thaker, Tempe, AZ (US); Gautam Dasarathy, Tempe, AZ (US)

(73) Assignee: Mitsubishi Electric Research Laboratories, Inc.

( * ) Notice: Subject to any disclaimer, the term of this patent is extended or adjusted under 35 U.S.C. 154(b) by 182 days.

(21) Appl. No.: 18/467,368

(22) Filed: Sep. 14, 2023

(65) Prior Publication Data
US 2024/0427327 A1     Dec. 26, 2024

Related U.S. Application Data

(60) Provisional application No. 63/522,798, filed on Jun. 23, 2023.

(51) Int. Cl.
*G05D 1/00* (2024.01)
*G06N 20/00* (2019.01)

(52) U.S. Cl.
CPC .......... *G05D 1/0088* (2013.01); *G06N 20/00* (2019.01)

(58) Field of Classification Search
CPC ...... G05D 1/0088; G05D 1/2464; G05D 1/43; G05D 1/648; G05D 1/6987;
(Continued)

(56) References Cited

U.S. PATENT DOCUMENTS 11,069,082 B1 *  7/2021  Ebrahimi Afrouzi .. H04N 23/56
11,153,503 B1 * 10/2021  Ebrahimi Afrouzi .. H04N 23/74
(Continued)

FOREIGN PATENT DOCUMENTS

WO    WO-2022213565 A1 * 10/2022  ............. G06F 18/24

OTHER PUBLICATIONS

Hong et al., Hierarchical Bayesian Bandits, 2022, Proceedings of the 25th International Conference on Artificial Intelligence and Statistics (AISTATS) 2022, PMLR: vol. 151, arXiv:2111.06929, 18 Pages.*

*Primary Examiner* — Andrew R Dyer
(74) *Attorney, Agent, or Firm* — Gene Vinokur

(57) ABSTRACT

A control system and a method for controlling search agents to perform search with noisy observations and probabilistic guarantees is provided. The control system collects confidence bounds of a probabilistic classification of at least one region within at least one path of a set of paths. The control system compares aggregations of the confidence bounds of the probabilistic classifications of each path of the set of paths based on the collected confidence bounds, a first path of a set of paths is selected, for visit by a first search agent based on the comparison. The control system commands the first search agent to visit the selected first path to collect measurements associated with each region within the selected first path. The control system updates the confidence bounds of the probabilistic classifications of each region within the selected first path based on the measurements associated with the corresponding regions.

20 Claims, 23 Drawing Sheets

(58) Field of Classification Search
CPC ........... G05D 2105/55; G05D 2105/89; G05D 2107/21; G05D 2107/36; G06N 20/00; G06N 7/01
USPC .......................................................... 701/23
See application file for complete search history.

(56) References Cited

U.S. PATENT DOCUMENTS

| | | | |
|---|---|---|---|
| 11,340,079 B1* | 5/2022 | Ebrahimi Afrouzi | ........................ G01C 21/188 |
| 11,348,269 B1* | 5/2022 | Ebrahimi Afrouzi | ... G01S 17/48 |
| 11,435,746 B1* | 9/2022 | Ebrahimi Afrouzi | ........................ G05D 1/0212 |
| 11,449,061 B2* | 9/2022 | Ebrahimi Afrouzi | ........................ A47L 11/4011 |
| 11,656,082 B1* | 5/2023 | Ebrahimi Afrouzi | ........................ G05D 1/0272 700/259 |
| 2022/0026920 A1* | 1/2022 | Ebrahimi Afrouzi | .... G06N 7/01 |
| 2022/0066456 A1* | 3/2022 | Ebrahimi Afrouzi | ........................ G06F 3/04883 |
| 2022/0187841 A1* | 6/2022 | Ebrahimi Afrouzi | ........................ G05D 1/0274 |
| 2022/0187847 A1* | 6/2022 | Cella | ...................... G06Q 10/06 |
| 2023/0078448 A1* | 3/2023 | Cella | ................ G06Q 10/06311 705/7.13 |

\* cited by examiner

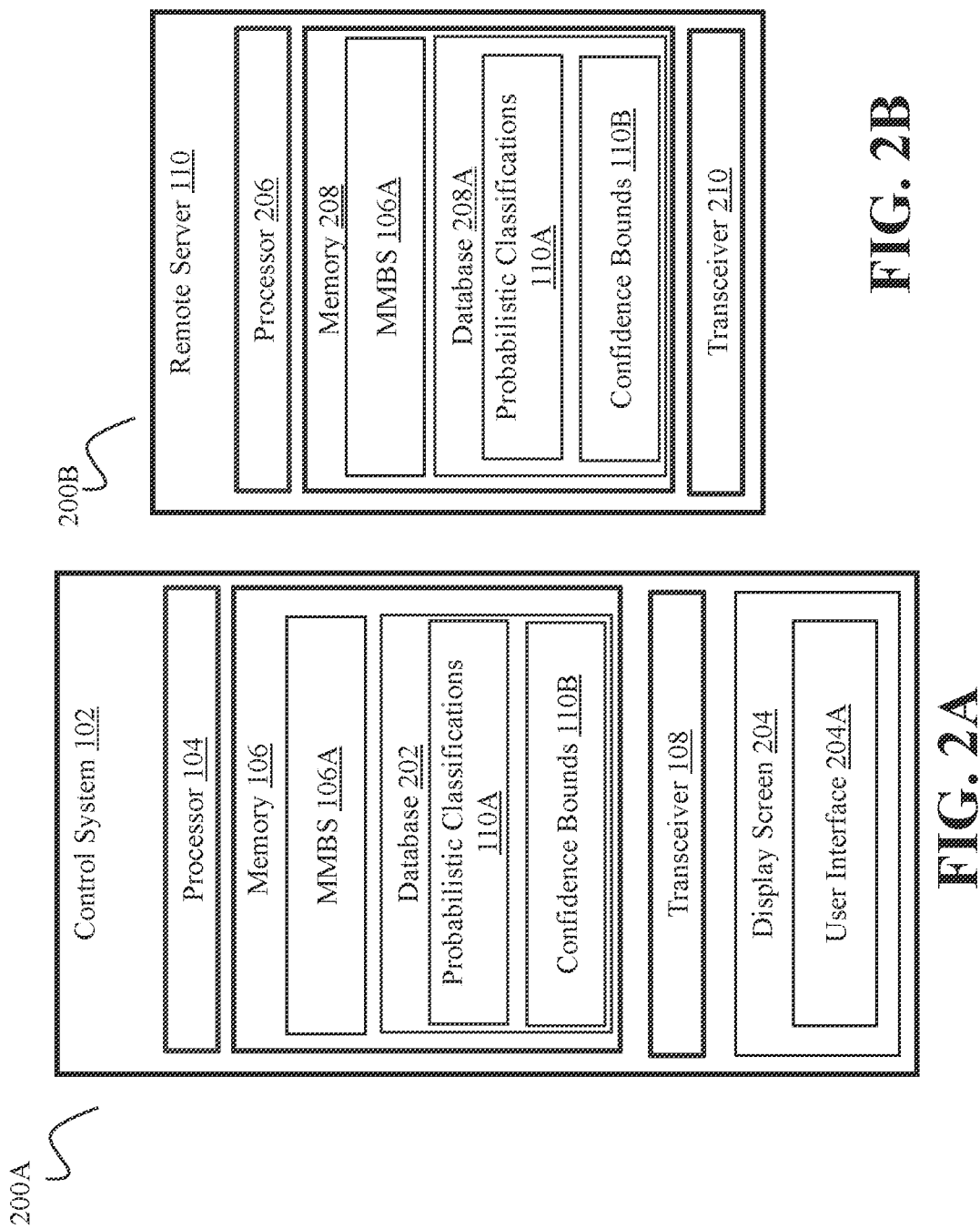

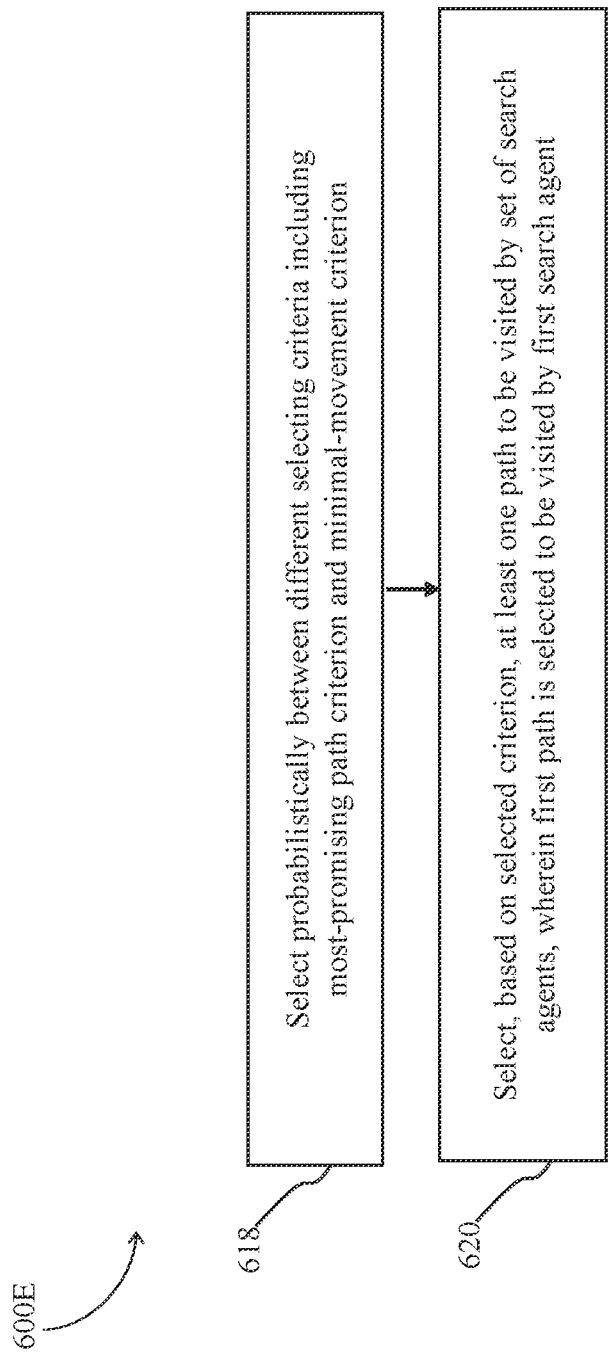

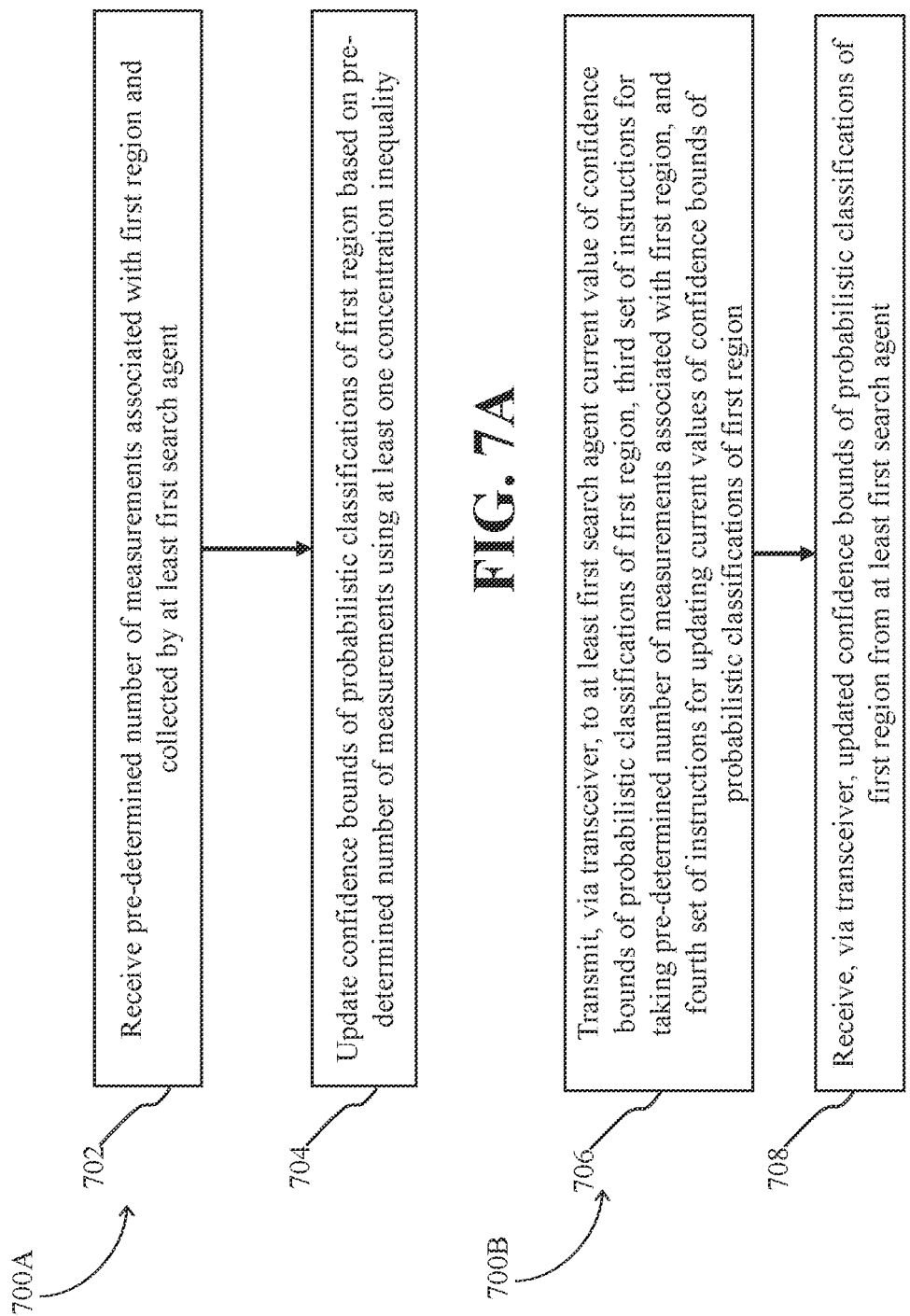

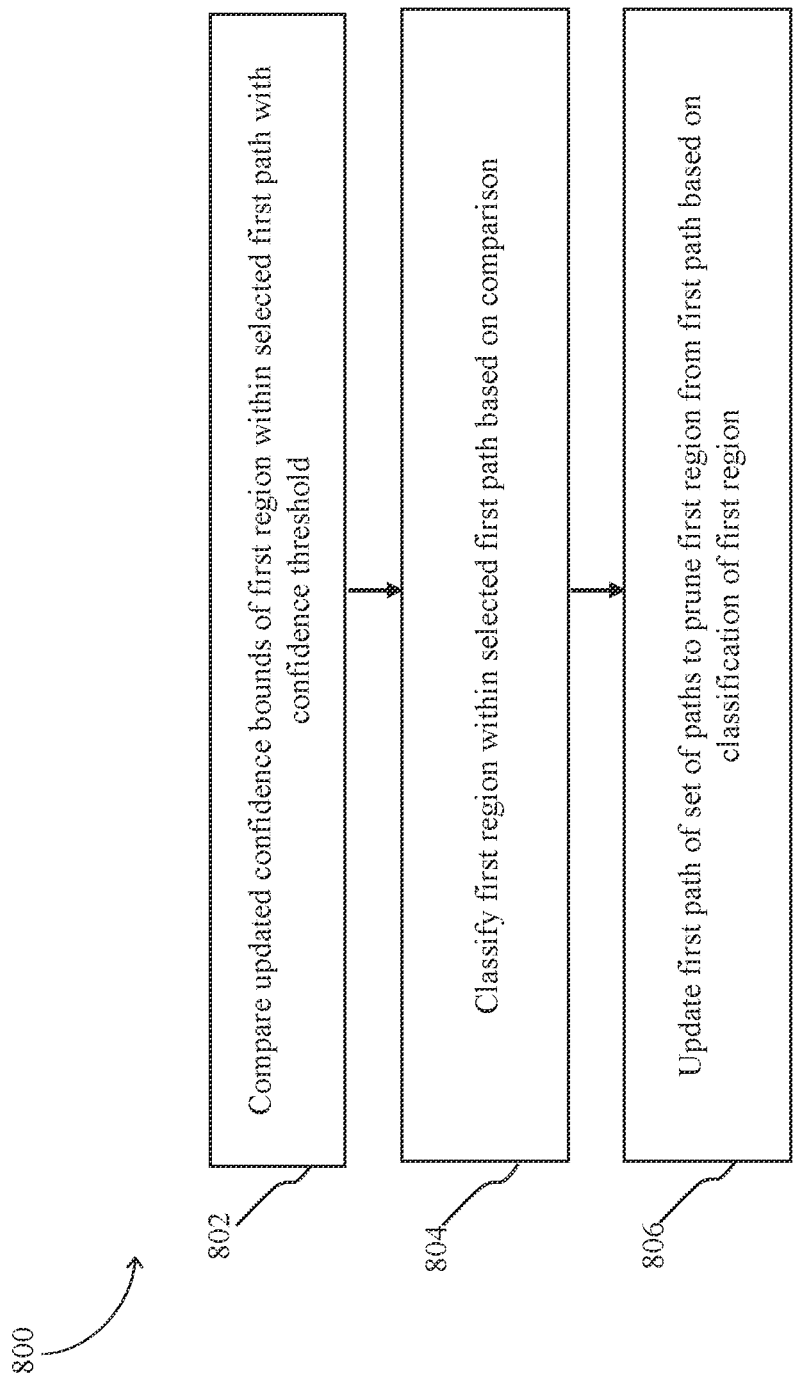

CONTROLLING SEARCH AGENTS TO PERFORM SEARCH WITH NOISY OBSERVATIONS AND PROBABILISTIC GUARANTEES

TECHNICAL FIELD

The disclosure relates generally to control applications, and more particularly to a control system and a method to control search agents to perform search with noisy observations and probabilistic guarantees.

BACKGROUND

With advancements in the field of machine learning, several types of algorithms are being used to solve a variety of real-life (or practical) problems optimally in a feasible amount of time. Examples of such real-life problems include, but are not limited to, a search-and-rescue operation, a ready-to-harvest tree detection for an agriculture application, a determination of congested areas in a city for a traffic monitoring application, an environmental monitoring application, a wildlife monitoring application, a disaster management application, and the like. Usually, such real-life problems are constrained to a physical environment (also referred to as a search environment) and traditional methods for solving such problems may be time-consuming, and cumbersome. For example, consider the ready-to-harvest tree detection problem to determine whether an apple orchard is ready for harvesting; such a problem may be specific to the apple orchard (i.e. the physical environment). Traditional methods for detecting whether the apple orchard is ready for harvesting typically involve people going to the apple orchard and manually inspecting the apple orchard to determine whether the apple orchard is ready for harvesting or not.

With the advent of time and the capabilities of computer systems, several computer-implemented techniques in combination with new devices (such as aerial vehicles) have emerged that are used to solve such real-life problems. For example, an autonomous multi-agent search technique for searching objects/phenomena of interest over large areas is crucial in the above-mentioned real-life applications. Regarding the above example of detecting whether the apple orchard is ready for harvesting, a set of search agents (e.g., aerial vehicles/drones) may fly in the apple orchard (or the search environment) to determine various parameters such as, but not limited to, a yield of one or more apple trees in the apple orchard, health of one or more apple trees in the apple orchard, and the like. As another example, in the case of the search-and-rescue operation where multiple humans are trapped on rooftops after a calamity (such as severe flooding) in a geographical area, the objective may be to identify areas using the set of search agents where a rescue team must be sent. Similar applications may be considered in infrastructure monitoring and wildfire rescue.

However, such computer-implemented techniques also have their limitations/constraints. For example, due to several types of constraints such as a cost constraint and a weight constraint, the set of search agents deployed in the apple orchard (or any physical environment) may only be able to carry low-cost and light sensors that may yield noisy data. Also, the economic costs associated with sensing by the set of search agents (e.g., battery energy for movement and sensing) must be reduced.

In some scenarios, autonomous monitoring systems are used to track spatial changes in the physical environment and other resources based on data collected by the sensors integrated within the set of search agents. However, the autonomous monitoring systems also encounter a problem that the set of search agents (e.g., aerial vehicles) must search over a pre-specified bounded area to identify regions of interest.

To solve the above-mentioned problem, the search environment is usually partitioned into a set of regions and a search agent of the set of search agents collects measurements and labels each region as an interesting region or an uninteresting region. For example, in the case of the search-and-rescue problem, the region where humans are detected (or where humans are likely to be found) may be classified as the interesting region, and the region where humans are not detected (where humans are less likely to be found) may be classified as the uninteresting region.

As discussed above, due to the cost constraint and weight constraint associated with the set of search agents, the set of search agents deployed in the search environment may only be able to carry low-cost and light sensors that usually result in noisy observation data. Given the stochastic nature of the sensors, it may be impractical to predict the amount of data needed to separate the interesting regions from the uninteresting regions. Consequently, the set of search agents must actively decide when and where to collect data based on current available data, while ensuring that deployment decisions are feasible for the set of search agents. Additionally, it may be important to consider constraints on the set of search agents arising from physical limitations like dynamics and energy limitations.

Autonomous monitoring has been an area of active research that spans several research communities including robotics, perception, learning, and control. However, existing approaches do not tackle all aspects of the above-mentioned problems. They may require improved sensing, may not have finite-time guarantees on the search performance, and/or may have high economic costs of search associated with movement and sensing. Other strategies may require prior knowledge of the total number of interesting regions to solve the multi-agent search problem. For example, some methods allow visiting each region multiple times allowing to reduce the amount of data collected at each visit. Other methods may prescribe collecting all necessary data to classify the visited region according to the object of the search at once. Examples of these search methods include a collaborative sensor network method, a branch and bound method, and a multi-arm bandit-based search method. However, these methods are based on some assumptions that may not be valid for some real-life applications. Specifically, the branch and bound method assumes the knowledge of probability distribution of the occurrence of targets (i.e., objects of interest) in the set of regions. Similarly, the collaborative sensor network method assumes the distribution of the target is Gaussian which allows using the collected data to estimate the parameters of a Gaussian distribution.

Currently, the "multi-arm bandit-based search" method includes strategies to identify maximal or top-k interesting regions in the set of regions (or a grid). However, the "multi-arm bandit-based search" method requires prior knowledge of a total number of interesting regions in the search environment to solve the considered multi-agent search problem and does not explicitly consider the physical limitations of the set of search agents.

Another existing solution to the autonomous monitoring problem is a "label-then-move" search. In the "label-then-move" search, at least one of the set of search agents keeps collecting enough data at a region until it is confident enough to label the region as an interesting region or an uninteresting region. The search agent may move to the next region only after labeling a current region as the interesting region or the uninteresting region. Since the "label-then-move" search ignores the data collected online when deciding on locations to sense, it may spend a significant amount of time labeling uninteresting regions and hence, may not be well suited for time-sensitive applications (such as the search-and-rescue problem).

Therefore, there is a requirement for systems and methods that aim to solve the challenges identified above.

SUMMARY

It is an object of the present disclosure to provide a method and a control system that addresses the above-mentioned problems associated with multiple search agents. Specifically, it is an object of the present disclosure to provide a method and a control system that focus on classifying each region of a set of regions in a search environment as interesting or uninteresting without any prior knowledge of the total number of interesting regions and/or uninteresting regions, explicitly considering the physical limitations and constraints of the set of search agents and provides output within the feasible amount of time so that the disclosed method may be used in real-time scenarios.

It is an object of some embodiments to disclose a control system, a remote server, and a method for controlling a set of search agents to perform classification of each region of the set of regions in the search environment using noisy observations and probabilistic guarantees. As used herein, the search agent may be an autonomous vehicle (say a drone), a mobile robot, an aerial drone, a ground vehicle, an aerial vehicle, a water surface vehicle, or an underwater vehicle. Additionally or alternatively, it is an object of some embodiments to disclose a data-driven method for multi-agent search under noisy observations allowing controlling of the set of search agents to move over the search environment partitioned into the set regions and to classify each region of the set of regions into one of the interesting region or the uninteresting region based on the data (or measurements) collected by one or more sensors installed within each search agent of the set of search agents. The collected data (or measurements) may be noisy due to the use of low-cost and low-weight systems (or perception systems) used in the search agents. Additionally, or alternatively, it is an object of some embodiments to co-ordinate the set of search agents to minimize the time required to identify all the interesting regions and the economic costs associated with moving the search agents (for example battery/fuel usage), despite the noise present in the collected data.

Furthermore, it is an object of some embodiments to provide a search method for controlling the search agents under noisy observation that may not rely on assumptions regarding the spatial distribution of one or more objects of interest or the sensing quality of one or more sensors. An example of such a method is a search method based on a bandit-based search algorithm, such as a "multi-arm bandit" algorithm. The "multi-arm bandit" algorithm may use collected data to tackle online, sequential decision-making problems. Specifically, given a choice between a fixed set of options (arms) and an unknown stochastic reward function that returns a reward upon execution of an option (pulling an arm), the "multi-arm bandit" algorithms may identify a sequence of execution of arms such that some desired criterion is satisfied (for example, minimize the regret of not executing the optimal option). Another variant of the "multi-arm bandit" algorithm known as a "thresholding multi-arm bandit" algorithm is a special class of "multi-arm bandit" algorithms that classify the arms into "good" and "bad" arms based on a user-specified threshold and online data. However, these algorithms assume that it may be possible to investigate any choice at any point in time.

The "multi-arm bandit" algorithms, in general, may synthesize a data-driven upper confidence bound on the return for each choice and then select choices based on the highest upper confidence bounds. The "multi-arm bandit" algorithm may not make any assumptions about the distribution of the objects of interest in the search environment and may provide a probabilistic performance guarantee for search exploration without any assumption(s). However, employing the current versions of the "multi-arm bandit" algorithm for the current search operations may be impractical because a direct application of the "thresholding multi-arm bandit" algorithm may force the search agents to traverse the environment without any regard for the economic costs and/or other physical constraints associated with the set of search agents. Consequently, the search agents may even run out of fuel or battery if the set of search agents may follow the search directly following a prescription of the bandit algorithms.

To that end, it is another object of some embodiments to adapt the search operations using the "multi-arm bandit" algorithm to consider the specifics of moving the search agents under the fuel constraints and dynamics constraints associated with the search agents.

Some embodiments may be based on an observation that the simplicity of another search method referred to herein as a "label-then-move" search, inadvertently and even accidentally results in the probabilistic performance guarantees of the search that consider specifics of moving the set of search agents. This may be because the "label-then-move" search approach controls the search agent to collect all necessary data (or measurements) to classify the region to avoid visiting the same region multiple times and controls the search agents to go to the neighboring region only after the classification of the current region is done, thereby reducing the travel cost of the search agent for going from one region to another.

As such, the "label-then-move" search may be a naive search algorithm that traverses the search environment and moves out of each region only after classifying it. Such an approach may incur low economic costs since it may make the search agents move minimally. But the "label-then-move" search approach may ignore the data collected online in deciding which region to sense next. Subsequently, the "label-then-move" search may take a long time to identify all the interesting regions.

Some embodiments are based on the intuition that a combination of the "multi-arm bandit" search method and the "label-then-move" search method may get synergy in reducing both the time and cost of the search operation. However, while each of the search methods may provide probabilistic performance guarantees, the combination of these methods may break it.

Some embodiments are based on the realization that the combination of these methods should also be probabilistic to preserve the probabilistic performance guarantees. For example, some embodiments switch between these search strategies based on repeated tosses of a biased coin. By tuning the bias of the coin and using a specific form of the upper confidence bound in the "thresholding multi-arm bandit" algorithm, some embodiments improve the performance of the combination of these two search algorithms over the performance of each search algorithm. Some embodiments obtain upper bounds on the performance of the searches by determining finite upper bounds on the time taken to complete the search, the time taken to label all interesting regions, and the costs incurred during the search according to some embodiments.

Some embodiments of the present disclosure may be based on a recognition that it may be possible to design a set of paths that may traverse the search environment such that the search agent may follow each of the designed set of paths and may have enough fuel (and/or battery) to finish the selected path. For example, the search environment may be partitioned into a set of paths (also referred to as a grid of cells), and the set of paths may be designed to traverse through each region of the set of regions (or cells) in the search environment, such that each path may start and end at a pre-designated region (such as a charging station) and may have a length feasible to be traversed without a need for intermediate charging. However, the problem of determining such a set of paths to cover all the regions in the search environment and subjected to one or more constraints may be a variant of the well-known problem in operations research, called the "multi-depot, fuel-constrained, multiple-vehicle routing" problem. The "multi-depot, fuel-constrained, multiple-vehicle routing" problem may be an NP-hard problem, which may necessitate a need for one or more approximation algorithms. The NP-hard problem may correspond to a class of hard problems that can be verified in polynomial time.

Some embodiments of the present disclosure may be based on the recognition that a collection of paths to solve the "multi-depot, fuel-constrained, multiple-vehicle routing problem" sub-optimally may be computed using a combination of dynamic programming and a sub-modular optimization. The proposed approach may scale well with an increase in the count of the set of search agents and the number of charging stations, covers all the regions (or the cells) in the search environment, and respects the fuel constraints associated with the set of search agents.

In comparison to the traditional techniques that may not have finite-time guarantees on the search performance or may have high economic costs of search associated with movement and sensing or require prior knowledge of the total number of interesting regions in the search environment, the disclosed control system classifies each region in the search environment effectively, and efficiently in the feasible amount of time and with probabilistic guarantees. Therefore, the disclosed control system overcomes all the limitations of the traditional techniques that are known in the art.

It is an object of some embodiments to disclose a control system to control a movement of at least a first search agent of a set of search agents in a search environment partitioned into a set of regions and to classify each region of the set of regions based on measurements collected by the first search agent. The control system includes a transceiver configured to exchange data with the set of search agents over a wired or wireless communication channel. The control system further includes a memory configured to store executable instructions specifying an operation of a multi-level multi-arm bandit search (MMBS) method. The MMBS method specifies a first set of instructions for individual probabilistic classifications of each region of the set of regions based on the measurements associated with the corresponding region, and a second set of instructions for visiting, by the set of search agents, each path of a set of paths formed from the set of regions based on comparing aggregations of the probabilistic classifications of each path of the set of paths. Each path of the set of paths may include at least two regions of the search environment. The control system further includes a processor coupled with the executable instructions, when executed by the processor, causes an iterative execution of the MMBS method until a termination condition is met. An iteration of the MMBS method causes the control system to collect confidence bounds of the probabilistic classification of at least one region within at least one path of the set of paths. The control system further compares aggregations of the confidence bounds of the probabilistic classifications of each path of the set of paths based on the collected confidence bounds. The control system further selects a first path of the set of paths to be visited by the first search agent based on the comparison. The control system further commands the first search agent to visit the selected first path and to collect measurements associated with each region within the selected first path. The control system may command the first search agent via the transceiver. The control system further updates the confidence bounds of the probabilistic classifications of each region within the selected first path based on the measurements associated with the corresponding regions.

In some embodiments, the control system may be configured to receive a set of user inputs associated with generation of the set of paths to cover the search environment. The control system may be further configured to generate the set of paths to cover the search environment based on the received set of user inputs.

In some embodiments, a first user input of the set of user inputs corresponds to a path length for each path of the set of paths. The path length for each path corresponds to a maximum number of regions in each path to be traversed by at least one search agent of the set of search agents.

In some embodiments, each path of the set of paths starts or ends at any pre-designated region of one or more pre-designated regions. At least one pre-designated region is located in a region inside the search environment, and at least one pre-designated region is located outside of the search environment.

In some embodiments, the pre-designated region corresponds to one of an energy refueling station, a calibration station, a service station, or a docking station. Each search agent of the set of search agents corresponds to one of an autonomous vehicle, a mobile robot, an aerial drone, a ground vehicle, an aerial vehicle, a water surface vehicle, or an underwater vehicle.

In some embodiments, the control system may be configured to generate the set of paths using a graph-based multi-agent path planning process that minimizes a first set of paths into the set of the paths covering the search environment subjected to one or more path constraints.

In some embodiments, the control system may be configured to construct, for each region of the set of regions, a shortest path table comprising a minimum number of steps required to reach any one of the one or more pre-designated regions in the search environment, where the shortest path table is constructed using one or more graph-based shortest path planning processes. The control system may be further configured to randomly generate the first set of paths satisfying the one or more path constraints by constructing a sequence of regions starting from a randomly selected pre-designated region from the one or more pre-designated regions in the search environment and executing hill ascend operation according to the shortest path table for a first half of the path length and further executing hill descend operation according to the shortest path table for a second half of the path length to reach one of the one or more pre-designated regions. The control system may be configured to select the set of paths from the first set of paths further based on the execution of the hill ascend operation and the hill descend operation.

In some embodiments, the control system may be configured to evaluate, for each path of the set of paths, a pre-determined aggregation function of the values of the confidence bounds of each region within the corresponding path. The control system may be further configured to sort the evaluation of the pre-determined aggregation function for each of the set of paths in descending order of a function value for each path. The function value is determined based on an application of the pre-determined aggregation function on the confidence bounds of each region in each path of the set of paths. The control system may be further configured to select, based on the sorting, at least one path to be visited by the set of search agents. The first path is selected to be visited by the first search agent.

In some embodiments, the control system may be configured to evaluate the confidence bounds of each region in each path of the set of paths, using a neural network that intakes the confidence bounds of each region in the corresponding path. The control system may be configured to return an assignment of the set paths to be executed by each search agent of the set search agents based on the evaluation. The first path is assigned to the first search agent. The control system may be configured to select, based on the assignment, at least one path to be visited by the set of search agents. The first path is selected to be visited by the first search agent based on the assignment.

In some embodiments, the control system may be configured to select probabilistically between different selecting criteria including a most-promising path criterion and a minimal-movement criterion. The control system may be further configured to select, based on the selected criterion, at least one path to be visited by the set of search agents. The first path may be selected to be visited by the first search agent.

In some embodiments, the probability of selection may be a biased probability.

In some embodiments, the selection of at least one path to be visited by the set of search agents is performed over multiple control steps dependent on a number of the regions in the search environment. A bias of the biased probability may vary between at least some control steps.

In some embodiments, the control system may be configured to update the bias based on the likelihood of interest at different regions of the set of regions in the search environment.

In some embodiments, the control system may be configured to update the confidence bounds of the different regions with a neural network trained with machine learning to produce the biased probability.

In some embodiments, the control system may be configured to select the first path and a second path from the set of paths based on the aggregations of the probabilistic classifications of each of the set of paths. The control system may be configured to control the movement of the first search agent and a second search agent of the set of search agents concurrently on the selected first path and the second path to take measurements associated with the corresponding regions within the first path and the second path.

In some embodiments, the control system may be configured to receive a pre-determined number of measurements associated with the first region and collected by at least the first search agent and update the confidence bounds of the probabilistic classifications of the first region based on the pre-determined number of measurements using at least one concentration inequality.

In some embodiments, the control system may be configured to transmit, via the transceiver, to at least the first search agent: a current value of the confidence bounds of the probabilistic classifications of the first region, a third set of instructions for taking a pre-determined number of measurements associated with the first region, and a fourth set of instructions for updating the current values of the confidence bounds of the probabilistic classifications of the first region. The control system may be further configured to receive, via the transceiver, the updated confidence bounds of the probabilistic classifications of the first region from at least the first search agent.

In some embodiments, the control system may be configured to compare the updated confidence bounds of a first region within the selected first path with a confidence threshold. The control system may be configured to classify the first region within the selected first path based on the comparison and update the first path of the set of paths to prune the first region from the first path based on the classification of the first region.

In some embodiments, each region of the set of regions is classified with a first label or a second label, and wherein the termination condition is met when each region of the set of regions is classified with one of the first label or the second label.

Another embodiment discloses a method for controlling a movement of at least a first search agent of a set of search agents in a search environment partitioned into a set of regions and classifying each region of the set of regions based on measurements collected by the first search agent comprising an iterative execution of a multi-level multi-arm bandit search (MMBS) method until a termination condition is met, wherein the MMBS method specifies a first set of instructions for individual probabilistic classifications of each region of the set of regions based on the measurements associated with the corresponding region, and a second set of instructions for visiting, by the set of search agents, each path of a set of paths formed from the set of regions based on comparing aggregations of the probabilistic classifications of different paths, wherein each path of the set of paths comprises at least two regions of the search environment, and wherein the iterative execution of MMBS includes collecting confidence bounds of the probabilistic classification of at least one region within at least one path of the set of paths. The method further includes comparing aggregations of the confidence bounds of each path of the set of paths based on the collected confidence bounds. The method further includes selecting a first path of the set of paths to be visited by the first search agent based on the comparison. The method further includes commanding, via a transceiver configured to exchange data with the set of search agents over a wired or wireless communication channel, the first search agent to visit the selected first path and to collect measurements associated with each region within the selected first path. The method further includes updating the confidence bounds of the probabilistic classifications of each region within the selected first path based on the measurements associated with the corresponding regions.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A is an exemplar block diagram of the control system of FIG. 1A, in accordance with an embodiment of the disclosure.

FIG. 2B is an exemplar block diagram of the remote server of FIG. 1A, in accordance with an embodiment of the disclosure.

FIG. 6E is a flowchart that illustrates an exemplar third method for the selection of a path from the set of paths to be visited by at least one search agent, in accordance with an embodiment of the disclosure.

FIG. 7A is a flowchart that illustrates an exemplar first method for updating confidence bounds of at least one region of the set of regions of the search environment, in accordance with an embodiment of the disclosure.

FIG. 7B is a flowchart that illustrates an exemplar second method for updating confidence bounds of at least one region of the set of regions of the search environment, in accordance with an embodiment of the disclosure.

FIG. 8 is a flowchart that illustrates an exemplar method for pruning a classified region from a corresponding path, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
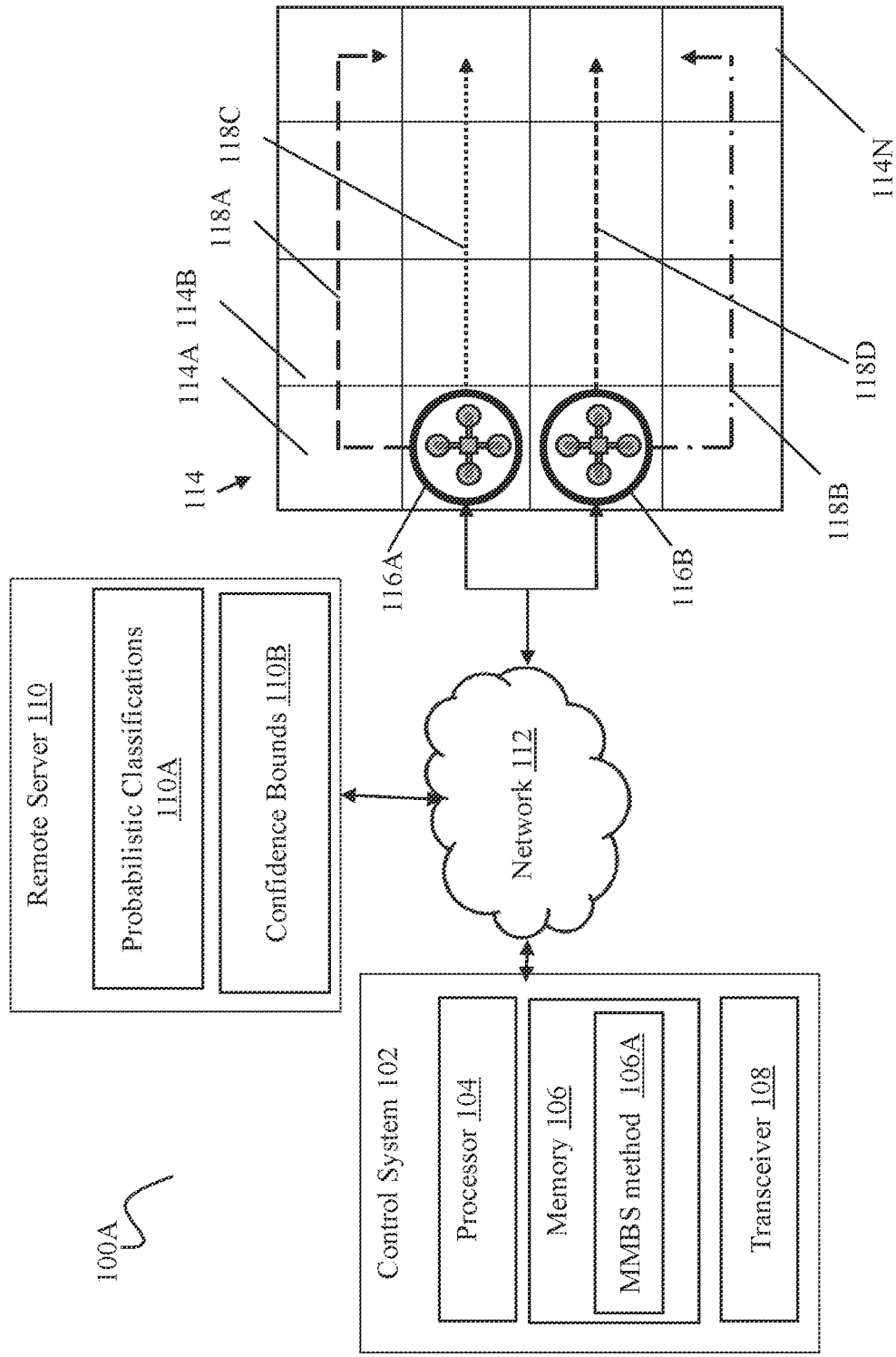
FIG. 1A is a diagram that illustrates a network environment for controlling search agents to perform search with noisy observations and probabilistic guarantees, in accordance with an embodiment of the disclosure.

FIG. 1A is a diagram that illustrates a network environment 100A for controlling search agents to perform search with noisy observations and probabilistic guarantees, in accordance with an embodiment of the disclosure. With reference to FIG. 1A, there is shown the network environment 100A. The network environment 100A includes a control system 102 that may further include a processor 104, a memory 106, and a transceiver 108. With reference to FIG. 1A, there is further shown a remote server 110, a search environment 114, and a network 112. The search environment 114 may be partitioned into a set of regions, such as a region 114A, a region 114B, and a region 114N (hereinafter referred to as the set of regions 114A-114N). There is further shown a set of search agents 116 and a set of paths 118. The set of search agents 116 may include, but is not limited to, a first search agent 116A, and a second search agent 116B. Similarly, the set of paths may include, but is not limited to, a first path 118A, a second path 118B, a third path 118C, and a fourth path 118D.

The control system 102 may include suitable logic, circuitry, interfaces, and/or code that may be configured to control the set of search agents 116 to perform search with noisy observations and probabilistic guarantees in the search environment 114. The control system 102 may be configured to iteratively execute a multi-level multi-arm bandit search (MMBS) method 106A for classifying each of the set of regions 114A-114N. Examples of the control system 102 may include, but are not limited to, a computing device, a mainframe machine, a server, a computer workstation, a smartphone, a cellular phone, a mobile phone, a gaming device, a consumer-electronic (CE) device and/or any other device with device control capabilities.

The processor 104 may comprise suitable logic, circuitry, and interfaces that may be configured to execute instructions stored in the memory 106. The processor 104 may be implemented based on a number of processor technologies known in the art. Examples of the processor 104 may include, but are not limited to, a Graphical Processing Unit (GPU), a co-processor, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, and a combination thereof.

The memory 106 may include suitable logic, circuitry, and/or interfaces that may be configured to store the program instructions executable by the processor 104. Specifically, the memory 106 may store executable instructions specifying an operation of the MMBS method 106A. Examples of implementation of the memory 106 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The MMBS method 106A may be used to classify each region of the set of regions 114A-114N of the search environment 112 in a feasible amount of time and with probabilistic guarantees. The MMBS method 106A may classify each region based on noisy measurements collected by the set of search agents 116. Moreover, the disclosed MMBS method 106A may select the next regions to be visited by the set of search agents 116 based on the confidence bounds of for each region 114A-114N, constructed using the collected noisy measurements. Moreover, the disclosed MMBS method 106A may control the movement of the set of search agents from one region to another region in the same path or from one region in one path to another region in another path. Therefore, the disclosed MMBS method 116A may not restrict the movement of the set of search agents 116 in a single path only. Also, the disclosed MMBS method 106A may probabilistically select between different selecting criteria including a most-promising path criterion and a minimal-movement criterion to classify the region and to further decide the next region to be visited by the set of search agents 116.

In an embodiment, the MMBS method 106A may specify a first set of instructions for individual probabilistic classifications 110A of each region of the set of regions 114A-114N based on measurements associated with the corresponding region, and a second set of instructions for visiting, by the set of search agents 116, each path of the set of paths 118 formed from the set of regions 114A-114N based on comparing aggregations of the probabilistic classifications 110A of each path of the set of paths 118. Each path of the set of paths 118 may formed from at least two regions of the search environment 114. The MMBS method 116A may be iteratively executed by the control system 102 until each region of the set of regions 114A-114N may be classified.

The transceiver 108 may include suitable logic, circuitry, and/or interfaces that may be configured to exchange data between the control system 102, the remote server 110, and the set of search agents 116. In an embodiment, the transceiver 108 may be configured to exchange data between the control system 102, the remote server 110, and the set of search agents 116 over a wired or wireless communication channel. Examples of the transceiver 108 may include, but are not limited to, a wireless transceiver, a radio frequency (RF) transceiver, an ethernet transceiver, and a fiber-optic transceiver.

The remote server 110 may include suitable logic, circuitry, and interfaces, and/or code that may be configured to control the set of search agents 116. The remote server 110 may be further configured to determine probabilistic classifications 110A, and confidence bounds 110B of at least one region of the set of regions 114A-114N or at least one path of the set of paths 118. The remote server 110 may be implemented as a cloud server and may execute operations through web applications, cloud applications, HTTP requests, repository operations, file transfer, and the like. Other example implementations of the remote server 110 may include, but are not limited to, a database server, a file server, a web server, a media server, an application server, a mainframe server, or a cloud computing server.

In at least one embodiment, the remote server 110 may be implemented as a plurality of distributed cloud-based resources using several technologies that are well known to those ordinarily skilled in the art. A person with ordinary skill in the art will understand that the scope of the disclosure may not be limited to the implementation of the remote server 110 and the control system 102 as two separate entities. In an embodiment, the remote server 110 may provide instructions to the control system 102 to perform the operations for the classification of each region in the search environment 114. In certain embodiments, the functionalities of the remote server 110 can be incorporated in its entirety or at least partially in the control system 102, without a departure from the scope of the disclosure.

The network 112 may include a communication medium through which the control system 102, the remote server 110, and the set of search agents 116 may communicate with each other. The network 112 may be one of a wired connection or a wireless connection. Examples of the network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100A may be configured to connect to the network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The search environment 114 may correspond to a portion of the physical environment (or geographical space) in a real-world environment. The search environment 114 may be associated with a problem statement that is being solved. For example, in case of a problem detecting whether the apple orchard is ready for harvesting, the search environment 114 may correspond to the apple orchard, and each region 114A-114N may correspond to the apple tree. As another example, in the scenario of the search-and-rescue operation where multiple humans are trapped on rooftops after a calamity, the search environment 114 may correspond to a geographical area where the calamity might have happened, and each region 114A-114N may be various rooftops in the region.

In an embodiment, the search environment 114 may be divided into the set of regions 114A-114N. Each region may be of a pre-determined shape and of pre-determined dimensions. In some embodiments, each region of the set of regions 114A-114N may be of the same shape and similar dimensions. In another embodiment, each region of the set of regions 114A-114N may be of different shapes and different dimensions. In an embodiment, the shape and the dimensions may be provided as a user input. Based on the user input, the control system 102 may be configured to partition the search environment 114 into the set of regions 114A-114N.

Each search agent of the set of search agents 116 may include suitable logic, circuitry, and interfaces, and/or code that may be configured to search the search environment 114 and take measurements from the corresponding region in which the search agent is deployed. In an embodiment, each search agent of the set of search agents 116 may be equipped with one or more sensors that may be configured to capture data associated with each region and transmit the captured data, as measurements, to the control system 102 or the remote server 110. As discussed above, the one or more sensors may be low-cost noisy sensors that may capture noisy data. Further, each search agent may have fuel or power constraints such that each search agent may work until the search agent runs out of fuel or power. Examples of each search agent of the set of search agents 116 may include, but are not limited to, an autonomous vehicle, a mobile robot, an aerial drone, a ground vehicle, an aerial vehicle, a water surface vehicle, or an underwater vehicle. As shown in the FIG. 1A, the set of search agents 116 may be the aerial drone and may include the first search agent 116A, and the second search agent 116B. In an embodiment, the set of search agents 116A may also be referred to as a search team.

Each path of the set of paths 118 may correspond to a route or a track that may have to be traversed by the at least one search agent of the set of search agents 116. Each path of the set of paths may be generated based on one or more path constraints and the fuel or power constraints of the set of search agents 116. Each path may include a minimum of two regions. The set of paths 118 may be generated in such a way that the whole search environment 114 is covered. As shown in the FIG. 1A, the set of paths 118 may include the first path 118A, the second path 118B, the third path 118C, and the fourth path 118D. In an embodiment, each path of the set of paths 118 may also be referred to as a feasible path and the set of paths 118 may be referred to as a set of feasible paths. Details about the generation of the set of paths 118 are provided, for example, in FIG. 2.

In operation, the search environment 114 may be portioned into the set of regions 114A-114N. Each region of the set of regions 114A-114N may correspond to a portion of the search environment 114. The control system 102 may be configured to control the movement of at least the first search agent 116A of the set of search agents 116 in the search environment 114 partitioned into the set of regions 114A-114N and to classify each region of the set of regions 114A-114N based on measurements collected by the first search agent 116A. The control system 102 may include the transceiver 108 that may be configured to exchange data with the set of search agents 116 over the network 112. The control system 102 may further include memory 106 configured to store executable instructions specifying the operation of the MMBS method 106A. The MMBS method 106A may specify the first set of instructions for individual probabilistic classifications 110A of each region of the set of regions 114A-114N based on the measurements associated with the corresponding region, and the second set of instructions for visiting, by the set of search agents 116, each path of the set of paths 118 formed from the set of regions 114A-114N based on comparing aggregations of the probabilistic classifications 110A of each path of the set of paths 118. The control system 102 may further include the processor 104. The processor 104 may be configured to cause an iterative execution of the MMBS method 106A until the termination condition is met. Each iteration of the MMBS method 106A may cause the control system 102 to collect measurements of a subset of the regions 114A-114N to construct confidence bounds 110B. The confidence bounds 110B may include an upper confidence bound and a lower confidence bound. In general, the upper confidence bound, and the lower confidence bound may be used to measure an uncertainty that may be associated with the measurements. The upper and the lower confidence bounds may provide a range within which a true value is likely to fall. Each region of the set of regions 114A-114N has a corresponding true value that may refer to the a priori unknown likelihood of being assigned with a label or classified into a specific category. For example, in case of a problem detecting whether the apple orchard is ready for harvesting, the true value associated with the region 114A is the apriori unknown likelihood of apple tree in region 114A is sensed to be ready for harvesting. The confidence bounds 110B may represent a range of probabilities assigned to each classification and further provide an estimation of the uncertainty associated with the classification. The upper confidence bound may represent an upper limit of this range, giving an upper limit estimate of a confidence score. On the other hand, the lower confidence bound may represent a lower limit of the range, giving the lowest possible value of the confidence score.

The probabilistic classification 110A may refer to assigning a probability to different classes or categories to each region of the set of regions 114A-114N. Instead of simply assigning a single class label to a given input, the probabilistic classification 110A may provide a probability distribution over all possible classes. In an embodiment, the control system 102 may be configured to determine the confidence bounds 110B of the probabilistic classification 110A of at least one region within at least one path of the set of paths 118 based on one or more measurements taken by at least the first search agent 116A of the set of search agents 116. In another embodiment, the control system 102 may be configured to collect the confidence bounds of the probabilistic classification 110A of at least one region within at least one path of the set of paths 118 from the remote server 110 or at least one of the set of search agents 116.

The processor 104 may be further configured to compare aggregations of the confidence bounds of the probabilistic classifications 110A of each path of the set of paths 118. In an embodiment, the processor 102 may be further configured to compare aggregations of the confidence bounds of the probabilistic classifications 110A of each path of the set of paths 118 based on the collected confidence bounds 110B. The aggregation of the confidence bounds 110B may correspond to combining the confidence bounds of each region of each path of the set of paths 118 in the search environment 114 using a pre-determined aggregation function. Such pre-determined aggregation function may include, but are not limited to, an addition function, an average function, a maximum function, or a minimum function. Once the aggregation of the confidence bounds 110B is determined for each path, the processor 104 may be configured to compare the determined aggregations. Details about the aggregation of the confidence bounds 110B are provided, for example, in FIG. 6A, FIG. 6B, FIG. 6C, and FIG. 6D.

The processor 104 may be further configured to select the first path 118A of the set of paths 118 to be visited by the first search agent 116A based on the comparison. In an example, the path for which the addition of the confidence bounds 110B yields a maximum value may be selected as the first path 118A. In another embodiment, the path for which the average of the confidence bounds 110B yields the maximum value may be selected as the first path 118A. Details about the selection of the first path 118A are provided, for example, in FIG. 6A, FIG. 6B, FIG. 6C, FIG. 6D, and FIG. 6E.

After the selection of the first path 118A, the processor 104 may be configured to command the first search agent 116A to visit the selected first path 118A. The processor 104 may further command the first search agent 116A to collect measurements associated with each region within the selected first path 118A. In an embodiment, the first search agent 116A may be commanded via the transceiver 108. The measurements associated with each region within the selected first path 118A may be captured by the one or more sensors embedded in the first search agent 116A. Examples of such measurements may include image data, sensor data, and the like. The measurements may vary according to the problem statement being solved. As a first example, if the problem being solved is the search-and-rescue operation, the measurements may correspond to one or more images captured by at least one image sensor embedded in the first search agent 116A.

In an embodiment, the processor 104 may be configured to select the first path 118A and the second path 118B from the set of paths 118 based on the aggregations of the probabilistic classifications of each of the set of paths 118. The processor 104 may be further configured to control the movement of the first search agent 116A and the second search agent 116B of the set of search agents 116 concurrently in the selected first path 118A and the second path 118B to take measurements associated with the corresponding regions within the first path 118A and the second path 118B.

The processor 104 may be further configured to update the confidence bounds 110B of the probabilistic classifications 110A of each region within the selected first path 118A based on the measurements associated with the corresponding regions. Specifically, the processor 104 may be further configured to increase (and/or decrease) the value of the confidence bounds 110B of the probabilistic classifications 110A of each region within the selected first path 118A. With reference to the first example, if the captured image includes humans, then the confidence bound of the corresponding region may be increased.

The processor 104 may be further configured to compare the updated confidence bounds 110B of a first region (say the first region 114A) within the first path 118A with a confidence threshold. The confidence threshold may correspond to a pre-determined user-specified threshold value for the classification of the first region 114A with a first label and a second label. In case the first label is assigned to the first region 114A, it may be deemed that the first region 114A is classified as the interesting region. In case the second label is assigned to the first region 114A, it may be deemed that the first region 114A is classified as the uninteresting region. The processor 104 may be further configured to classify the first region 114A within the first path 118A based on the comparison. For example, the control system 102 may classify the first region 114A as interesting with a high probability whenever the lower confidence bound may be greater than the confidence threshold. Similarly, the control system 102 may classify the first region 114A as uninteresting with a high probability whenever the upper confidence bound may be less than the confidence threshold. Details about the classification are provided below, for example, in FIG. 8, FIG. 13, FIG. 14A, FIG. 14B, and FIG. 15.

Figure 1B:
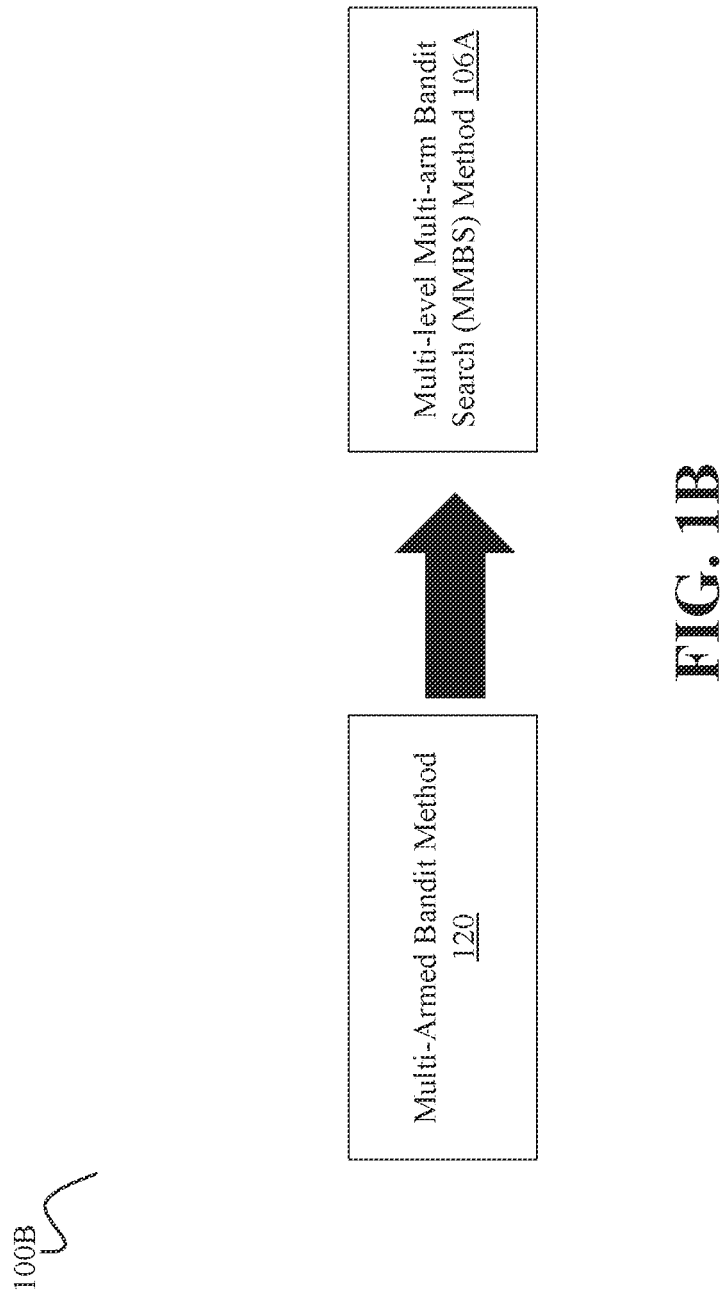
FIG. 1B depicts a diagram to illustrate a difference between the multi-arm bandit search method and a multi-level multi-arm bandit search (MMBS) method, in accordance with an embodiment of the disclosure.

FIG. 1B depicts a diagram to illustrate a difference between the multi-arm bandit search method and a multi-level multi-arm bandit search (MMBS) method, in accordance with an embodiment of the disclosure. FIG. 1B is explained in conjunction with elements from FIG. 1A. With reference to FIG. 1B, there is shown a diagram 100B.

Traditionally, a multi-armed bandit search method 120 may be a problem-solving framework in the field of machine learning as well as optimization and may be used in situations where there is a need to balance exploration (trying different options to learn about their rewards) and exploitation (choosing the best-known option to maximize cumulative rewards).

Specifically, the multi-armed bandit search method 120 may be used to solve a multi-armed bandit problem that may be a classical sequential decision-making problem in which the set of search agents 116 may be faced with a set of "arms" (or actions), each with an unknown and stochastic reward distribution. The goal of the set of search agents 116 may be to maximize a cumulative reward obtained over the series of actions, while also learning about the reward distribution of each arm through exploration.

In comparison with the traditional multi-armed bandit search method 120 which can classify each region of the set of regions 114A-114N without any probabilistic and time-frame guarantees, the disclosed MMBS method 106A may be able to classify each region of the set of regions 114A-114N of the search environment 112 in a feasible amount of time along with probabilistic guarantees. Also, the disclosed MMBS method 106A may control the movement of the set of search agents from one region to another region in the same path or from one region in one path to another region in another path whereas the traditional multi-armed bandit search method 120 may restrict the movement of the set of search agents 116 in a single path only.

FIG. 2A is an exemplary block diagram of the control system of FIG. 1A, in accordance with an embodiment of the disclosure. FIG. 2A is explained in conjunction with elements from FIG. 1A and FIG. 1B. With reference to FIG. 2A, there is shown a block diagram 200A of the control system 102. The control system 102 may include the processor 104, the memory 106, and the transceiver 108. With reference to FIG. 2A, there is further shown a database 202, and a display screen 204 that may include a user interface 204A. The processor 202 may be communicatively coupled to the database 202, the display screen 204, the memory 106, and the transceiver 108.

The database 202 may include suitable logic, circuitry, code, and/or interfaces that may be configured to store the confidence bounds 110B and the probabilistic classifications 110A for each region and each path in the search environment 114. In another embodiment, the database 202 may store program instructions to be executed by the control system 102. In another embodiment, the database 202 may store the set of paths 118 in the search environment 114. Example implementations of the database 202 may include, but are not limited to, a centralized database, a distributed database, a no structured query language (NoSQL) database, a cloud database, a relational database, a network database, an object-oriented database, and a hierarchical database.

The display screen 204 may comprise suitable logic, circuitry, and interfaces that may be configured to display assigned labels to each region of the set of regions 114A-114N. In an embodiment, the display screen 204 may further display the confidence bounds 110B of each region in the search environment 114. The touch screen may be at least one of a resistive touch screen, a capacitive touch screen, or a thermal touch screen. The display screen 204 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 204 may refer to a display screen of a head-mounted device (HMD), a smart-glass device, a see-through display, a projection-based display, an electro-chromic display, or a transparent display.

The user interface 204A may be configured as a medium for a user to interact with the control system 102. The user interface 204A may be a dynamic interface that may change according to the configuration of the control system 102. In some embodiments, the control system 102 may receive a set of user inputs from the user of the control system via the user interface 204A.

FIG. 2B is an exemplary block diagram of the remote server of FIG. 1A, in accordance with an embodiment of the disclosure. FIG. 2B is explained in conjunction with elements from FIG. 1A, FIGS. 1B, and 2A. With reference to FIG. 2B, there is shown a block diagram 200B of the remote server 110. The remote server 110 may include a processor 206, the memory 208, a database 208A, and the transceiver 210. The processor 206 may be communicatively coupled to the memory 208, and the transceiver 210.

The processor 206 may comprise suitable logic, circuitry, and interfaces that may be configured to execute instructions stored in the memory 208 for controlling search agents to perform search with noisy observations and probabilistic guarantees. The processor 206 may be implemented based on a number of processor technologies known in the art. Examples of the processor 206 may include, but are not limited to, the GPU, the co-processor, the CPU, the x86-based processor, the RISC processor, the ASIC processor, the CISC processor, and a combination thereof.

The memory 208 may include suitable logic, circuitry, and/or interfaces that may be configured to store the program instructions executable by the processor 206. Specifically, the memory 208 may store executable instructions specifying an operation of the MMBS method 106A. In an embodiment, the memory 208 may include the database 208A. The database 208A may be configured to store the probabilistic classification 110A and the confidence bounds 110B. In an embodiment, the memory 208 may be similar to the memory 106 of the control system 102. Examples of implementation of the memory 208 may include, but are not limited to, the RAM, the ROM, the EEPROM, the HDD, the SSD, the CPU cache, and/or the SD card.

The transceiver 210 may include suitable logic, circuitry, and/or interfaces that may be configured to exchange data between the remote server 110, the control system 102, and the set of search agents 116. In an embodiment, the transceiver 210 may be configured to exchange data between the remote server 110, the control system 102, and the set of search agents 116 over a wired or wireless communication channel. Examples of the transceiver 210 may include, but are not limited to, a wireless transceiver, a radio frequency (RF) transceiver, an ethernet transceiver, and a fiber-optic transceiver.

Figure 3:
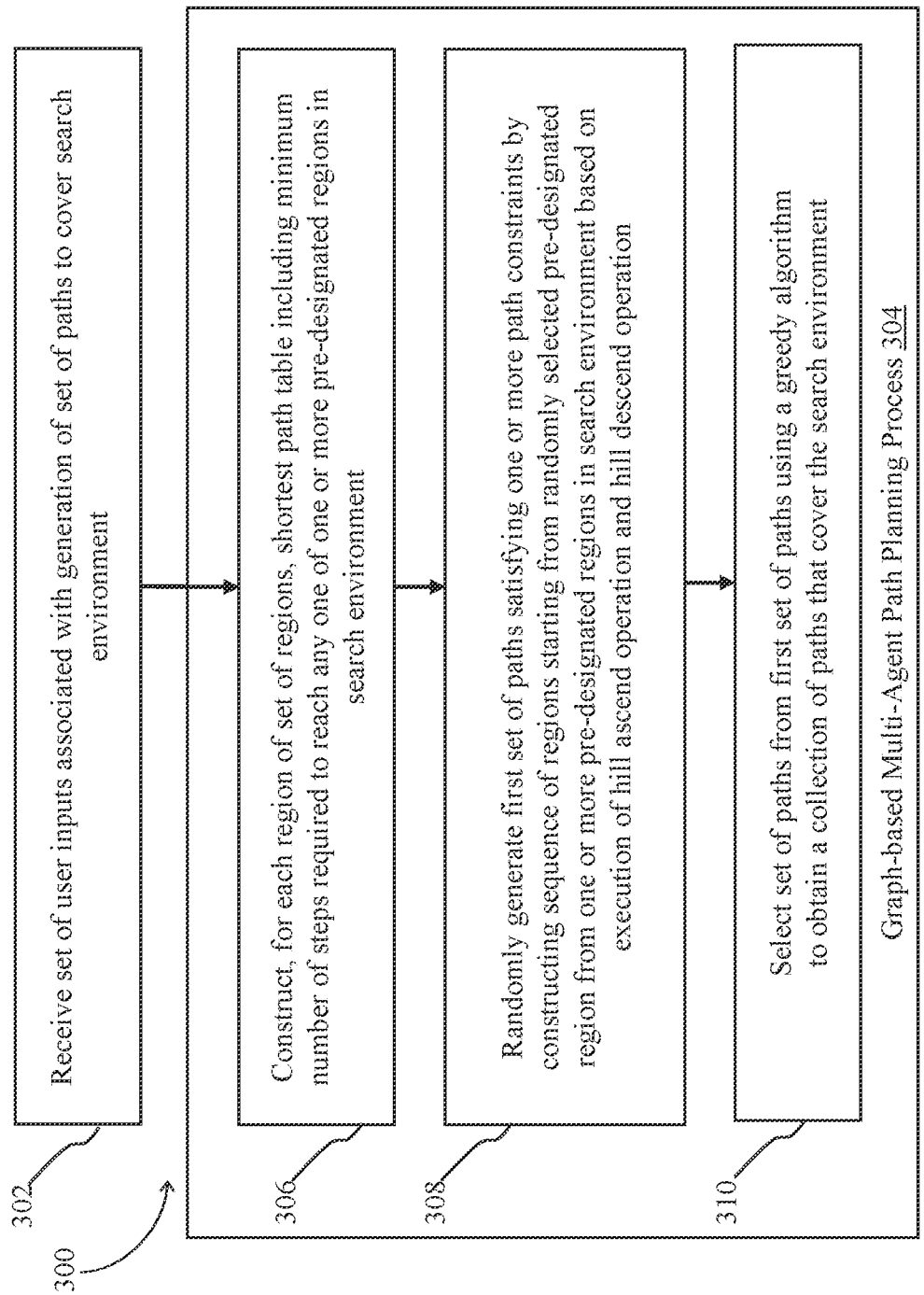
FIG. 3 is a flowchart that illustrates an exemplar method for the generation of a set of paths, in accordance with an embodiment of the disclosure.

FIG. 3 is a flowchart 300 that illustrates an exemplary method for the generation of the set of paths 118, in accordance with an embodiment of the disclosure. FIG. 3 is explained in conjunction with elements from FIG. 1A, FIG. 1B, FIG. 2A, and FIG. 2B. With reference to FIG. 3, there is shown the flowchart 300. The operations of the exemplary method may be executed by any computing system, for example, by the control system 102 or the processor 104, or the remote server 110 of FIG. 1A. The operations of the flowchart 300 may start at 302.

At 302, a set of user inputs may be received. In an embodiment, the processor 104 may be configured to receive the set of user inputs associated with generation of the set of paths to cover the search environment 114. Specifically, the set of user inputs may correspond to one or more path constraints. The set of user inputs may include, but are not limited to, a first user input, a second user input, and a third user input.

The first user input may correspond to a path length for each path for each of the set of paths 118. The path length for each path may correspond to a maximum number of regions in each path that maybe traversed by at least one search agent of the set of search agents 116 while satisfying its physical constraints, wherein the physical constraints can be due to the motion constraints of the search agents and limited on-board energy available for the search agents.

The second user input may be indicative of a starting region and an ending region of each path of the set of paths 118. In an embodiment, each path of the set of paths 118 may start and/or end at a pre-designated region of one or more pre-designated regions. In an embodiment, at least one pre-designated region may be located inside the search environment 114. In another embodiment, at least one pre-designated region may be located outside of the search environment 114. The pre-designated region may correspond to one of an energy refueling station, a calibration station, a service station, or a docking station. The energy refueling station may correspond to a charging station or a fuel station where the set of search agents 116 may recharge their batteries or refuel themselves. The calibration station may correspond to a region where one or more parameters or one or more sensors associated with the set of search agents 116 may be calibrated. The service station may correspond to a region where the set of search agents 116 may be serviced or repaired. The docking station may correspond to a region where the set of search agents 116 may dock when they are not in use.

The third user input may be indicative of one or more restricted regions that must not be included in any path of the set of paths 118. These regions could be obstacles in the search environment, gps-denied environments, or regions that are known to be uninteresting from the beginning.

In an embodiment, the control system 102 may be configured to receive the set of user inputs from the user of the control system 102 via the user interface 204A of the display screen 204.

The received set of user inputs may be provided as an input to a graph-based multi-agent path planning process 304. In an embodiment, the processor 104 may be configured to transmit the received set of user inputs to the graph-based multi-agent path planning process 304 to generate the set of paths 118 to cover the search environment 114. The graph-based multi-agent path planning process 304 may include the operations 306, 308, and 310 as described below.

At 306, a shortest path table may be constructed. In an embodiment, the processor 104 may be configured to construct a shortest path table for each region of the set of regions 114A-114N in the search environment 114. The shortest path table may include a number that may be assigned to each region (i) of the set of regions 114A-114N. The assigned number may indicate a minimum of steps required to reach any one of the one or more pre-designated regions in the search environment 114 from the corresponding associated with the shortest path table. For example, if the shortest path connecting the pre-designated region to the current region has a length 2, then the current region may be assigned with the number '2'. It may be noted that the minimum number of steps may be between 0 (at the charging station) to [T/2], where T is the path length specified in the first user input of the set of user inputs. In an embodiment, the shortest path table may be constructed using one or more graph-based shortest path planning processes (or techniques). Examples of the one or more graph-based shortest path planning processes may include, but are not limited to, dynamic programming algorithms, a breadth-first search algorithm, or an A* algorithm.

In an embodiment, the processor 104 may be configured to compute the path table using the dynamic programming and using the following recursion for computing functions $V_k$:

$$G \to \left[ 0, \left\lfloor \frac{T}{2} \right\rfloor \right],$$

where G is the set of N regions. The processor 104 may set $V_0(i)=0$ if the region i correspond to any one of the one or more pre-designated regions, otherwise, $V_0(i)=+\infty$ (in implementation a large number).

The processor 104 may further compute $V_k$ using the following dynamic programming recursion for $$k = \left\{ 1, 2, \ldots, \left\lfloor \frac{T}{2} \right\rfloor \right\}:$$

$$V_k(i) = 1 + \min_{i^+ \in Neighbor(i)} V_{k-1}(i^+),$$

for every region, i in the set of regions 114A-114N that may not be covered by an obstacle with Neighbor(i) may be the set of regions 114A-114N that may be visited by at least one search agent at region i. By definition, Neighbor(i) is always a subset of G. Some embodiments are based on the realization that the set Neighbor(i) can encode any physical constraints on the motion of the search agents 116. As discussed above, the processor 104 may set $V_0(i)=0$ if the region i may correspond to the pre-designated region and set $V_0(i)=+\infty$ (in implementation a very large number) for the remaining regions (i.e. the regions covered by an obstacle). The desired shortest path table map may be given by $$V_{\left\lfloor \frac{T}{2} \right\rfloor}.$$

At 308, a first set of paths may be generated. In an embodiment, the processor 104 may be configured to randomly generate the first set of paths that may satisfy the one or more path constraints by constructing a sequence of regions starting from a randomly selected pre-designated region of the one or more pre-designated regions in the search environment 122 based on execution of hill ascend operation and hill descend operation.

The processor 104 may be further configured to randomly generate the first set of paths (also referred to as C feasible paths) by randomly choosing any pre-designated region, denoted by R, and executing a hill ascend operation according to the shortest path table for a first half of the path length. The hill ascend operation may refer to an optimization technique that may be used to find the optimal values for the parameters of a model. The goal is to climb the "hill" of the objective function (here, $V_{\left\lfloor \frac{T}{2} \right\rfloor}$)

by moving towards the highest point for maximization. Specifically, the processor 104 may execute the hill ascend operation for $$\left\lfloor \frac{T}{2} \right\rfloor$$

steps while breaking ties randomly, where at each iteration it appends to the currently constructed path (originating from R) a region in the set Neighbor(i) where i is its current location that has the highest value in $$V_{\left\lfloor \frac{T}{2} \right\rfloor}.$$

The processor 104 may further execute a hill descend operation according to the shortest path table for a second half of the path length to reach one of the one or more pre-designated regions. By construction, all these paths may satisfy one or more path constraints, including the requirements that it originates and terminates in one of the pre-designated regions while ensuring that the path does not fly over the obstacle regions and the path length is no longer than the maximum path length T.

At 310, the set of paths 118 (or a set of feasible paths) may be selected. In an embodiment, the processor 104 may be configured to select the set of paths 118 from the first set of paths based on the execution of the hill ascend operation and the hill descend operation. Specifically, the processor 104 may be configured to use one or more greedy algorithms to select the set of paths 118 that may cover the search environment 114. Specifically, the control system 102 may sequentially select feasible paths from the first set of paths constructed at block 306 that may have the least overlap with the selected set of paths. Such one or more greedy algorithms may be known to return a minimal collection of paths that cover the search environment 114 with bounded suboptimality. In an embodiment, the processor 104 may be configured to select the minimal number of paths, as the set of paths 118 that together cover the search environment 114, from the first set of paths using existing algorithms for set-cover problems like the greedy algorithms. Specifically, the greedy algorithm starts with a second set of paths initialized with a randomly chosen path from the first set of paths, and then repeats the following steps until a termination criterion is met—first, evaluate the overlap among each one of paths in the first set to the cover generated by the paths in second set, second, remove the path in the first set that has the least overlap from the first set, and third, add the removed path to the second set. A commonly used termination criterion for the greedy algorithm is that either the first set is empty or the collection of paths in the second set together covers the search environment. Details about the selected set of paths are provided, for example, in FIG. 4.

Figure 4:
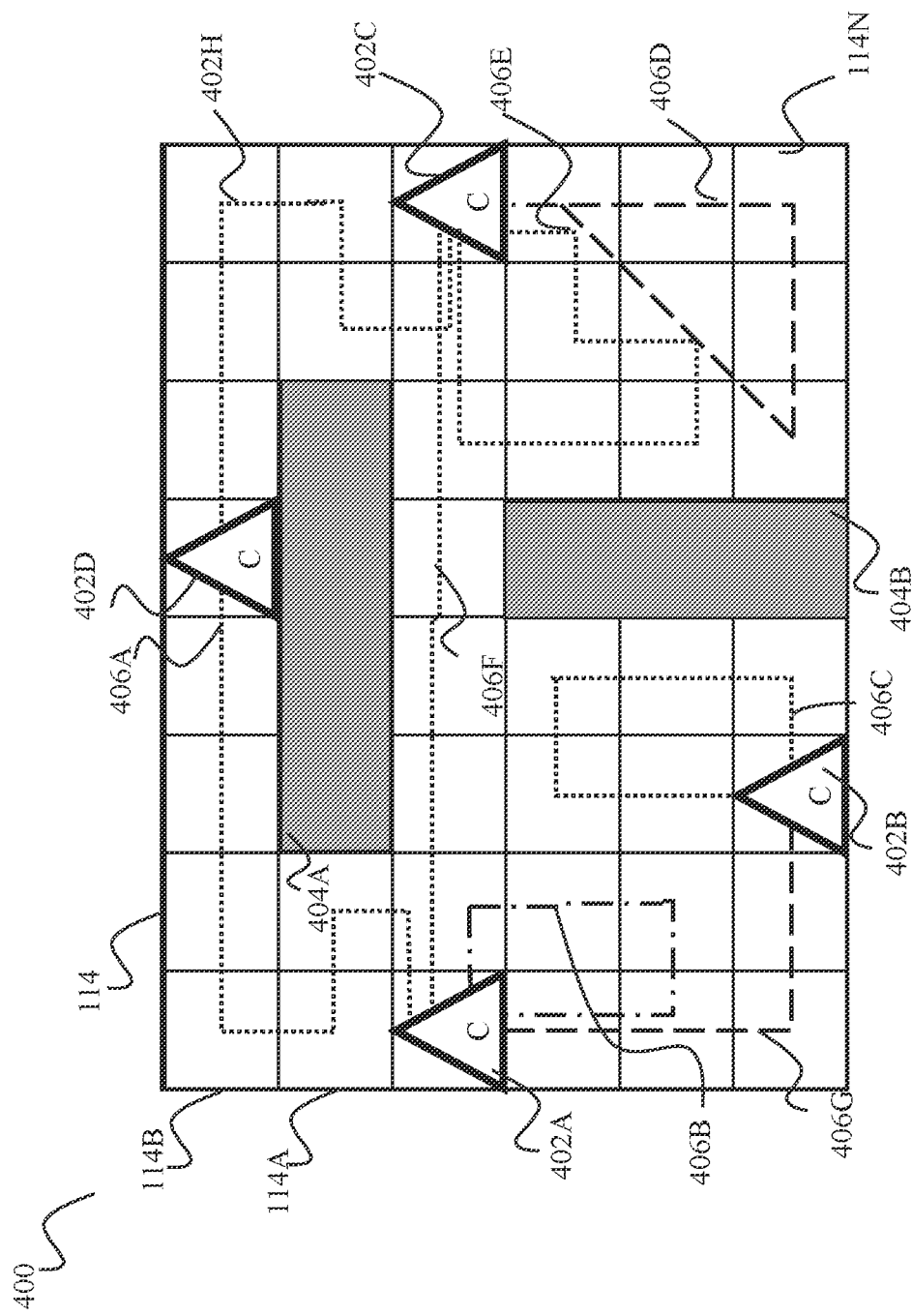
FIG. 4 is a diagram that depicts a generated set of paths in the search environment, in accordance with an embodiment of the disclosure.

FIG. 4 is a diagram that depicts the generated set of paths in the search environment, in accordance with an embodiment of the disclosure. FIG. 4 is explained in conjunction with elements from FIG. 1A, FIG. 1B, FIG. 2, and FIG. 3. The path length of each path may be set as eight (8) or the path length may include at most eight (8) regions. With reference to FIG. 4, there is shown a diagram 400 that depicts the search environment 114 partitioned into the set of regions 114A-114N. With reference to FIG. 4, there is further shown a first pre-designated region 402A, a second pre-designated region 402B, a third pre-designated region 402C, and a fourth pre-designated region 402D (hereinafter collectively referred to as one or more pre-designated regions 402). There is further shown a first restricted region 404A, and a second restricted region 404B (hereinafter collectively referred to as one or more restricted regions 404). There is further shown a first path 406A, a second path 406B, a third path 406C, a fourth path 406D, a fifth path 406E, a sixth path 406F, a seventh path 406G, and an eighth path 406H (hereinafter collectively referred to as a set of paths 406) that cover the search environment 114.

As discussed above, each of the one or more pre-designated regions 402 may correspond to a region from where each path of the set of paths 406 may start and/or end. Each of the one or more pre-designated regions 402 may correspond to one of the energy refueling station, the calibration station, the service station, or the docking station from the set of search agents 116. Each search agent of the set of search agents 116 may be charged, calibrated (or sensor calibration), serviced, or docked at any one of the one or more pre-designated regions 402.

Each of the one or more restricted regions 404 may correspond to a region where any search agent of the set of search agents 116 may not be allowed to visit or must not visit. As an example, the one or more restricted regions may correspond to a military installation. Other examples of restricted regions 404 may include obstacles like tall buildings or trees and GPS-denied areas in the search environment.

Each path of the set of paths 406 may correspond to a combination of at least two regions and may be formed based on the one or more path constraints. The one or more path constraints may include the path length for each path of the set of paths 406, each path of the set of paths 406 must start and/or ends at any pre-designated region of one or more pre-designated regions 402, and any path must not include the one or more restricted regions 404. Based on the one or more path constraints, the processor 104 may be configured to generate the set of paths 406 to cover the search environment 114. As discussed above, the set of paths 406 may include the first path 406A, the second path 406B, the third path 406C, the fourth path 406D, the fifth path 406E, the sixth path 406F, the seventh path 406G, and the eighth path 406H. The set of paths may also be referred to as the set of feasible paths or feasible paths, hereinafter.

The first path 406A may originate from the first pre-designated region 402A and may terminate at the fourth pre-designated region 402D and may have the path length of 8. The second path 406B may originate from the first pre-designated region 402A and may terminate at the first pre-designated region 402A and may have the path length of 6. The second path 406B is illustrated in a dashed-dotted line to distinguish it from others. The third path 406C may originate and terminate at the second pre-designated region 402B and may have the path length of 6. The fourth path 406D may originate and terminate at the third pre-designated region 402C and may have the path length of 8. The fourth path 406D is illustrated in a dashed line to distinguish it from others. The fifth path 406E may originate and terminate at the third pre-designated region 402C and may have the path length of 8. The sixth path 406F may originate from the first pre-designated region 402A and may terminate at the third pre-designated region 402C and may have the path length of 7. The seventh path 406G may originate from the first pre-designated region 402A and may terminate at the second pre-designated region 402B and may have the path length of 5. The seventh path 406G is illustrated in a dashed line to distinguish it from others. The eighth path 406H may originate from the fourth pre-designated region 402D and may terminate at the third pre-designated region 402C and may have a path length of 7.

In an embodiment, the set of paths 406 may be dependent on locations of the one or more pre-designated regions 402 and locations of the one or more restricted regions 404. It may also be possible that for a given configuration of the one or more pre-designated regions 402, the one or more restricted regions 404, and a maximum path length T, there may be no set of feasible paths 406 that may cover the entire search environment 114. In such a situation, the one or more pre-designated regions 402 may be updated at appropriate locations to rectify such a situation. For example, the control system 102 may be configured to update the locations of one or more pre-designated regions 402 within (or outside) the search environment 114 to determine the set of paths 406. Alternatively, the search environment could be shrunk to only include regions that are covered by at least one path identified in 310.

Figure 5:
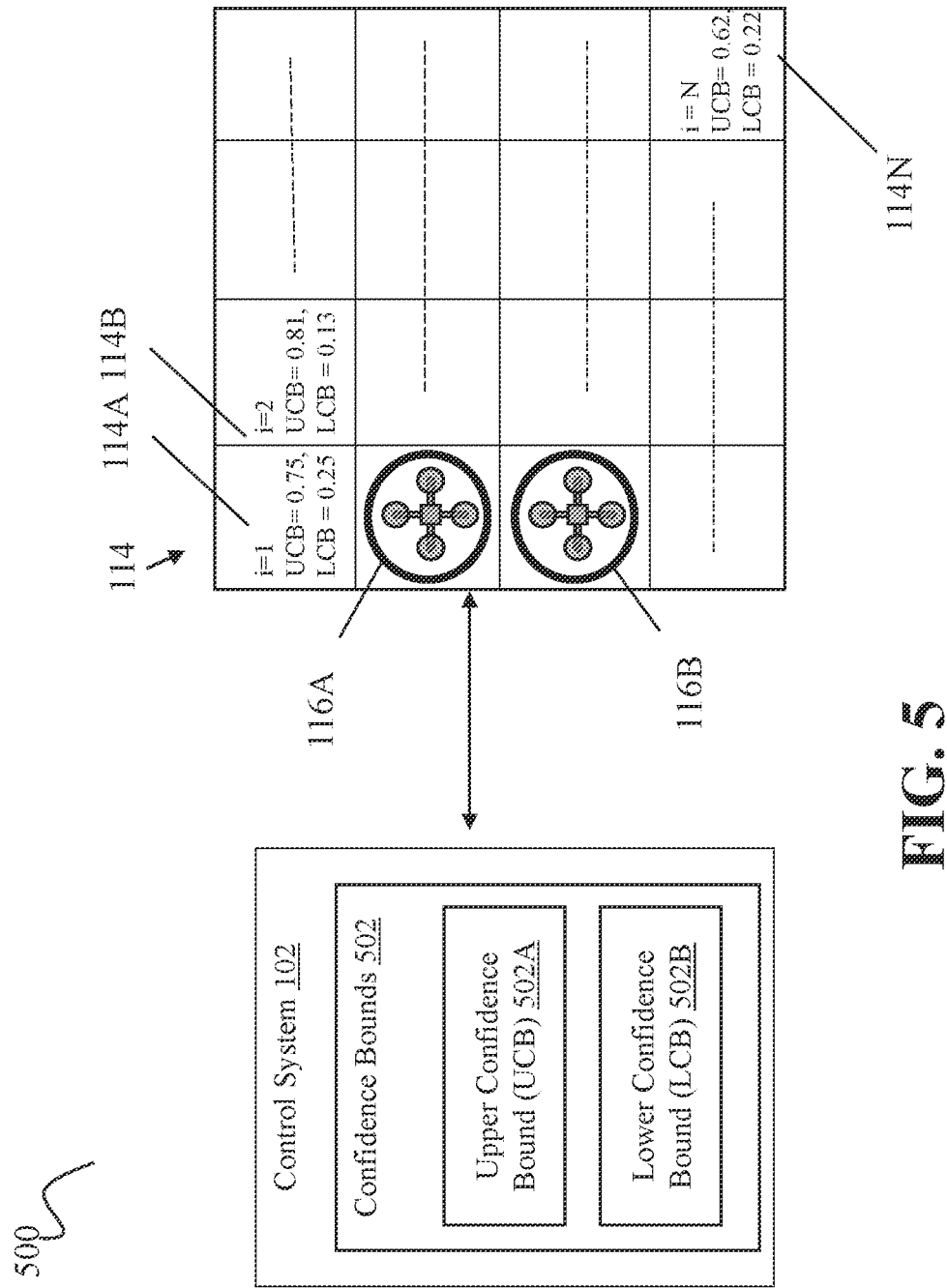
FIG. 5 is a diagram that depicts confidence bounds associated with each region of the set of regions of the search environment, in accordance with an embodiment of the disclosure.

FIG. 5 is a diagram that depicts confidence bounds associated with each region of the set of regions of the search environment, in accordance with an embodiment of the disclosure. FIG. 5 is explained in conjunction with elements from FIG. 1A, FIG. 1B, FIG. 2A, FIG. 2B, FIG. 3, FIG. 4, and FIG. 5. With reference to FIG. 5, there is shown a diagram 500 that includes the control system 102, the search environment 114 partitioned into the set of regions 114A-114N, and the set of search agents 116. There is further shown confidence bounds 502 associated with each region (i) of the set of regions 114A-114N. The confidence bounds 502 may include an upper confidence bound (UCB) 502A, and a lower confidence bound (LCB) 502B.

As discussed in FIG. 1A, the upper confidence bound (UCB) 502A may correspond to a statistical method that may be used to estimate an upper limit or maximum value of potential outcomes with a certain level of confidence. The lower confidence bound (LCB) 502B may be the opposite of UCB 502A and may be used to estimate the lower limit or minimum value with a certain level of confidence. Together, the UCB 502A and the LCB 502B may help determine a range within which the true value of a variable lies, allowing decision-makers to make informed choices considering the level of uncertainty involved.

While any valid confidence bound suffices, the control system 102 (or the remote server 110) may use the following bounds to bound the unknown Bernoulli parameter μ given M realizations $\{u_j\}_{j=1}^{M}$ of a Bernoulli variable for the search environment 114 with N regions. The UCB 502A and the LCB 502B may be calculated using equation (1) and equation (2) respectively.

$$UCB = \frac{\sum_{j=1}^{M} u_j}{M} + 2\sqrt{\frac{2\ \log(\log_2(2M)) + \log(12N/\delta)}{2M}} \quad (1)$$

$$LCB = \frac{\sum_{j=1}^{M} u_j}{M} - 2\sqrt{\frac{2\ \log(\log_2(2M)) + \log(12N/\delta)}{2M}} \quad (2)$$

It may be noted that the UCB 502A and the LCB 502B may be constructed using the sample mean of the M realizations and a correction term that may approach zero as M increases. These constructed bounds are such that upon termination, the proposed approach, which classified regions using these bounds and confidence threshold, returns a valid classification of the search environment 114 with a probability no smaller than 1-δ, where δ may be the probability of unreliability. Typically, the chosen probability of unreliability δ may be set to a small number.

In the apple orchard example described above, each region is an apple tree, and the Bernoulli variable associated with the region can be used to model the output of the noisy measurement when a search agent visits the tree. The noisy measurement could say that the tree is ready for harvesting or not with some unknown probability μ, the true mean of the Bernoulli variable. To classify the tree as ready for harvesting, it suffices to have the true mean above a confidence threshold. However, since the true mean is unknown, we use upper confidence bound and lower confidence bounds as a surrogate for the true mean to arrive at a valid classification. Specifically, by when the upper confidence bound is below a confidence threshold, it is evident that the true mean is also below the confidence threshold with high probability, indicating that the tree is not ready for harvesting with high probability. On the other hand, when the lower confidence bound is above a confidence threshold, it is evident that the true mean is also above the confidence threshold with high probability, indicating that the tree is ready for harvesting with high probability. Here, M in (1) and (2) refers to the number of visits of the particular apple tree by the search team, and $\{u_j\}_{j=1}^{M}$ indicate the binary measurements associated with each visit by the search team where $u_j$ is one (1) when the search team measured it as ready-to-harvest, and $u_j$ is zero (0) otherwise.

The control system 102 may be configured to collect the confidence bounds 502 of the probabilistic classification 110A of each region of the set of regions 114A-114N. Specifically, the control system 102 may be configured to collect the confidence bounds 502 of the probabilistic classification 110A of at least one region within at least one path of the set of paths 118. As shown in FIG. 5, each region (i) may have the associated UCB 502A and LCB 502B at any point of time based on the measurements collected so far. For example, in the first region 114A (when i=1), the value of UCB 502A may be 0.75, and the value of LCB 502B may be 0.125. As another example, the value of UCB 502A and the value of LCB 502B for the second region (when i=2) may be 0.81 and 0.13, respectively. Similarly, the UCB 502A and the LCB 502B associated with the Nth region 114N (when i=N) may be 0.62 and 0.22, respectively.

In an embodiment, the control system 102 may be configured to assign an initial value of each of the UCB 502A and the LCB 502B to each region of the set of regions 114A-114N. These initial values could be used to encode prior information about the search environment 116, or could be The values of the UCB 502A and the LCB 502B may be updated iteratively based on the measurements collected by the set of search agents 116 as described in the above figures.

Figure 6A:
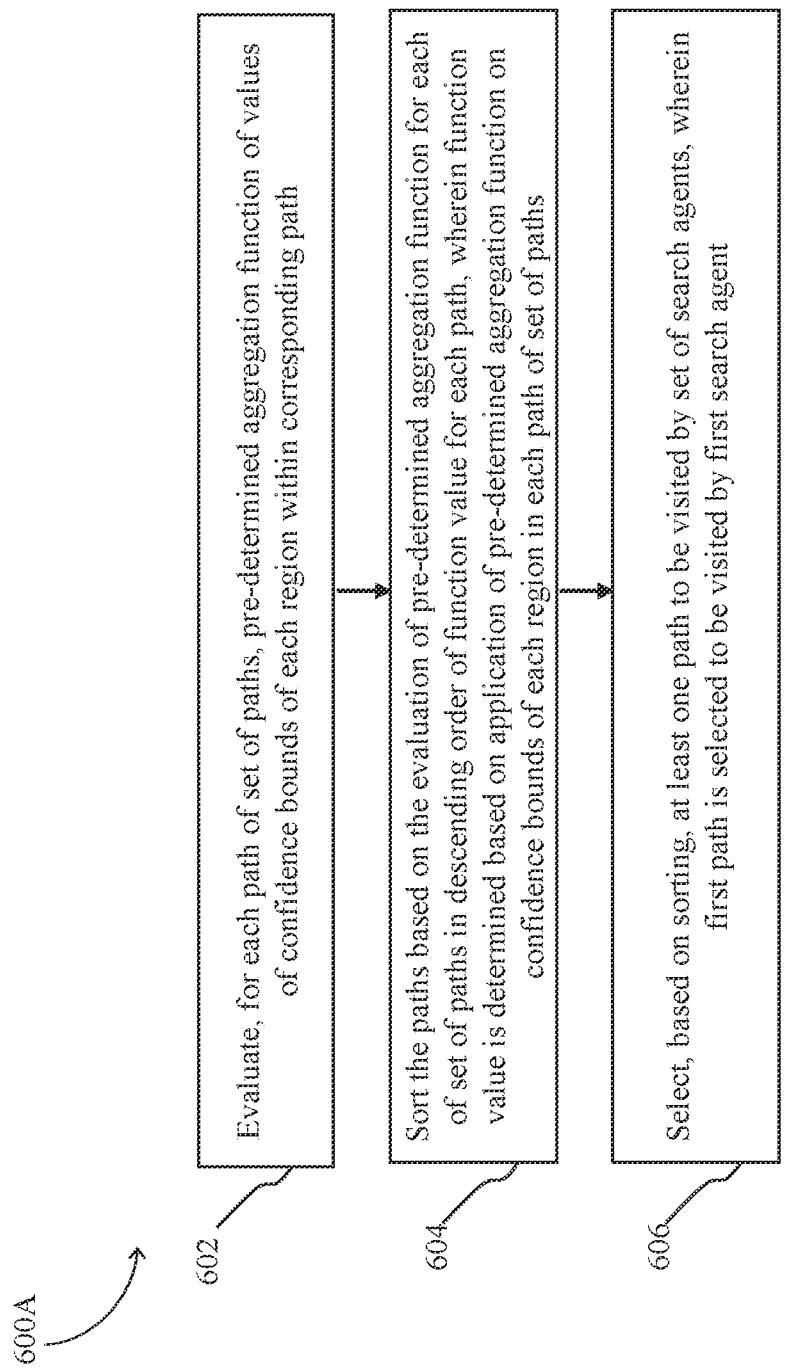
FIG. 6A is a flowchart that illustrates an exemplar first method for the selection of a path from the set of paths to be visited by at least one search agent, in accordance with an embodiment of the disclosure.

FIG. 6A is a flowchart 600A that illustrates an exemplary first method for the selection of a path from the set of paths 118 to be visited by at least one search agent, in accordance with an embodiment of the disclosure. FIG. 6A is explained in conjunction with elements from FIG. 1A, FIG. 1B, FIG. 2A, FIG. 2B, FIG. 3, FIG. 4, and FIG. 5. With reference to FIG. 6A, there is shown the flowchart 600A. The operations of the exemplary method may be executed by any computing system, for example, by the control system 102 or the processor 104, or the remote server 110 of FIG. 1A. The operations of the flowchart 600A may start at 602.

At 602, a pre-determined aggregation function may be evaluated. In an embodiment, the processor 104 may be configured to evaluate the pre-determined aggregation function of the values of the confidence bounds 502 of each region within the corresponding path. In an embodiment, the processor 104 may be configured to evaluate the pre-determined aggregation function for each path of the set of paths 118 in the search environment 114. The pre-determined aggregation function (also referred to as a summary function or a combining function) may be a type of function that may calculate a single value from the values of the confidence bounds 502 of each region within the corresponding path. In an embodiment, the pre-determined aggregation function may correspond to at least one of an addition function, an average function, a maximum function, or a minimum function. The sum function may calculate a total value of the confidence bounds 502 of each region within the corresponding path. The average function calculates an average value of the confidence bounds 502 of each region within the corresponding path. The maximum and minimum functions return the largest and smallest values of the confidence bounds 502 of each region within the corresponding path, respectively. In an embodiment, the sum function may be used only if the path length of each path of the set of paths 118 is same. Otherwise, the sum function may generate results that may be biased towards the paths that have greater path length as compared to other paths. For example, if the path length of a first path is 6 and the path length of all other paths is less than 6, then the result of the sum function will always be biased towards the first path because the sum value for the first path may be greater than the sum value of all the other paths.

At 604, the evaluation of the pre-determined aggregation function for each of the set of paths 118 may be sorted. In an embodiment, the processor 104 may be configured to sort the evaluation of the pre-determined aggregation function for each of the set of paths 118 in a descending order of a function value for each path of the set of paths 118. In an embodiment, the function value may be determined based on an application of the pre-determined aggregation function on the confidence bounds 502 of each region in each path of the set of paths 118. By way of example, if a count of the set of paths 118 is 11, then there may be 11 functional values that may be sorted in the descending order.

At 606, at least one path may be selected for at least one search agent. In an embodiment, the processor 104 may be configured to select at least one path to be visited by the set of search agents 116. The selection of the at least one path may be based on the sorting of the evaluation of the pre-determined aggregation function. In an embodiment, the processor 104 may be configured to select as many paths from the top of the sorted list as a count of the set of search agents 116. For example, if there are 3 search agents in the set of search environment 114, then the first 3 paths may be selected from the top of the sorted list. The selected top 3 paths may be randomly assigned to any search agent of the set of search agents 116. In an embodiment, the first path may be selected to be visited by the first search agent 116A based on the sorting. Control may pass to the end.

In an embodiment, the selection of at least one path to be visited by the set of search agents 116 various over each iteration of 600A. Specifically, after execution of the paths, the confidence bounds associated with each region may change, which in turn affects the aggregate value in 602, the sorting arrangement in 604, and the selected paths in 606 at the next iteration. Since the updates can be done immediately or over multiple iterations to give time for the search team to upload the measurements to the remote server, and the updates themselves depend on the collected date, the sequence of selected paths is stochastic and depends on a variety of factors including the search environment 114, the path length T, the locations of the pre-designated areas 402, the restricted regions 404, and the data collected by the search team.

Figure 6B:
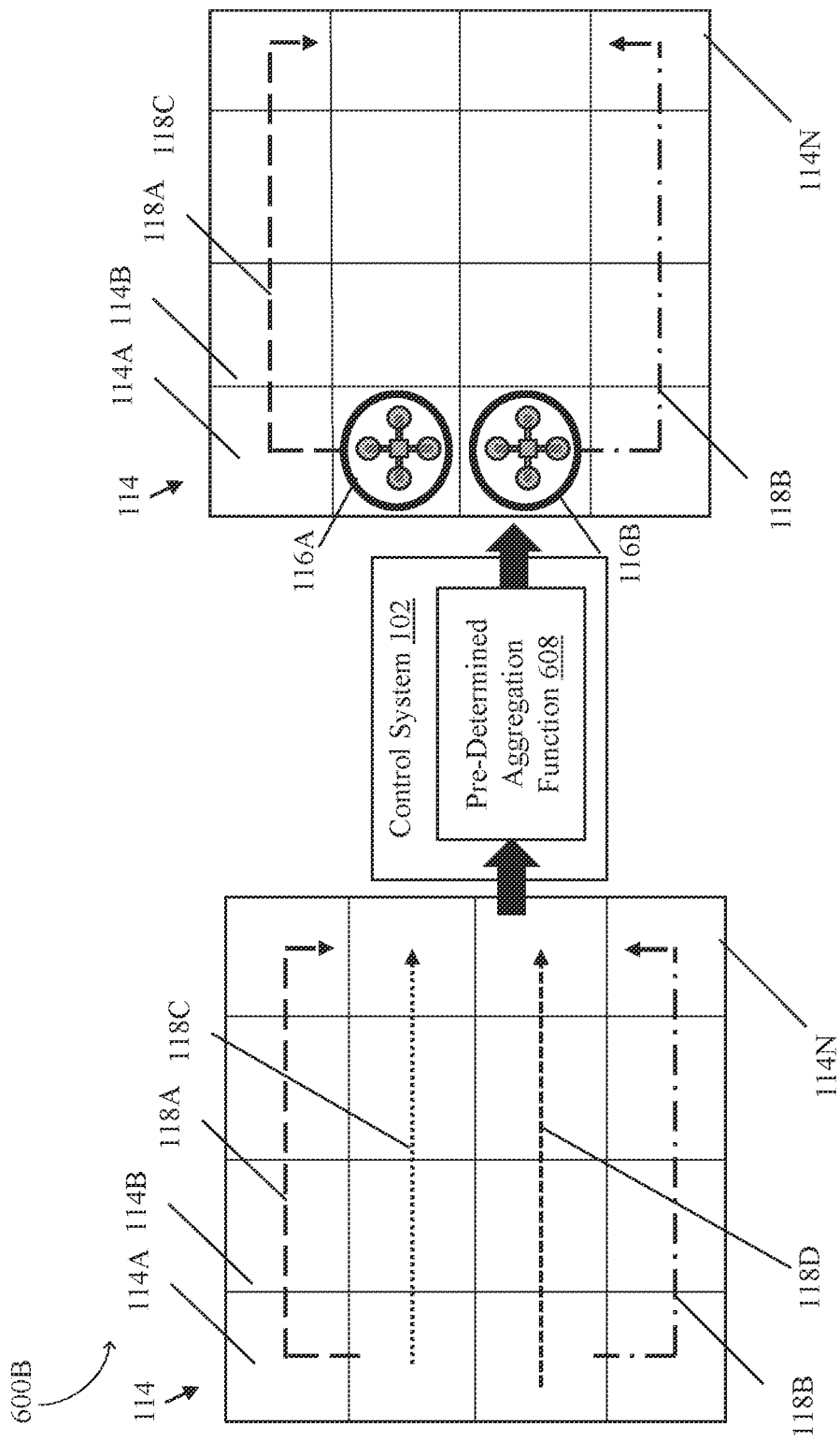
FIG. 6B depicts a diagram to illustrate an exemplar scenario for selecting paths to be visited by at least one search agent, in accordance with an embodiment of the disclosure.

FIG. 6B depicts a diagram to illustrate an exemplary scenario 600B for selecting paths to be visited by at least one search agent, in accordance with an embodiment of the disclosure. FIG. 6B is explained in conjunction with elements from FIG. 1A, FIG. 1B, FIG. 2A, FIG. 2B, FIG. 3, FIG. 4, FIG. 5, and FIG. 6A. With reference to FIG. 6B, there is shown an exemplary scenario 600B. The exemplary scenario 600B may include the control system 102, the search environment 114 partitioned into a set of regions 114A-114N, and the set of search agents 116 including the first search agent 116A, and the second search agent 116B. With reference to FIG. 6B, there is further shown the set of paths 118 including the first path 118A, the second path 118B, the third path 118C and the fourth path 118D.

The system 102 may be configured to evaluate a pre-determined aggregation function 608 of the values of the confidence bounds of each region within the corresponding path. The pre-determined aggregation function 608 may be evaluated for each path of the set of paths 118. As discussed above, the pre-determined aggregation function 608 may correspond to at least one of the addition function, the average function, the maximum function, or the minimum function. For example, if the pre-determined aggregation function 608 is the average function, the control system 102 may be configured to evaluate the average of the values of the confidence bounds of each region within each path of the set of paths 118. Based on the evaluation, it may be determined that the first path 118A may have the highest (or maximum) average value, the second path 118B may have a second highest (or second maximum) average value, the third path 118B may have a third highest (or third maximum) average value, and the fourth path 118D may have a fourth highest (or fourth maximum) average value. Since the first path 118A may have the highest average value, the control system 102 may assign the first path 118A to the first search agent 116A. In another embodiment, the control system 102 may be further configured to assign the second path 118B to the second search agent 116B as the average value for the second path 118B may be maximum after the first path 118A.

In an embodiment, after a first epoch, the control system 102 may be configured to select a next region to visited of the set of regions 114A-114N. The next region may lie within the same path as that of a current region of the set of regions 114A-114N. In another embodiment, the next region may lie in a different path as that of the current region of the set of regions 114A-114N.

Figure 6C:
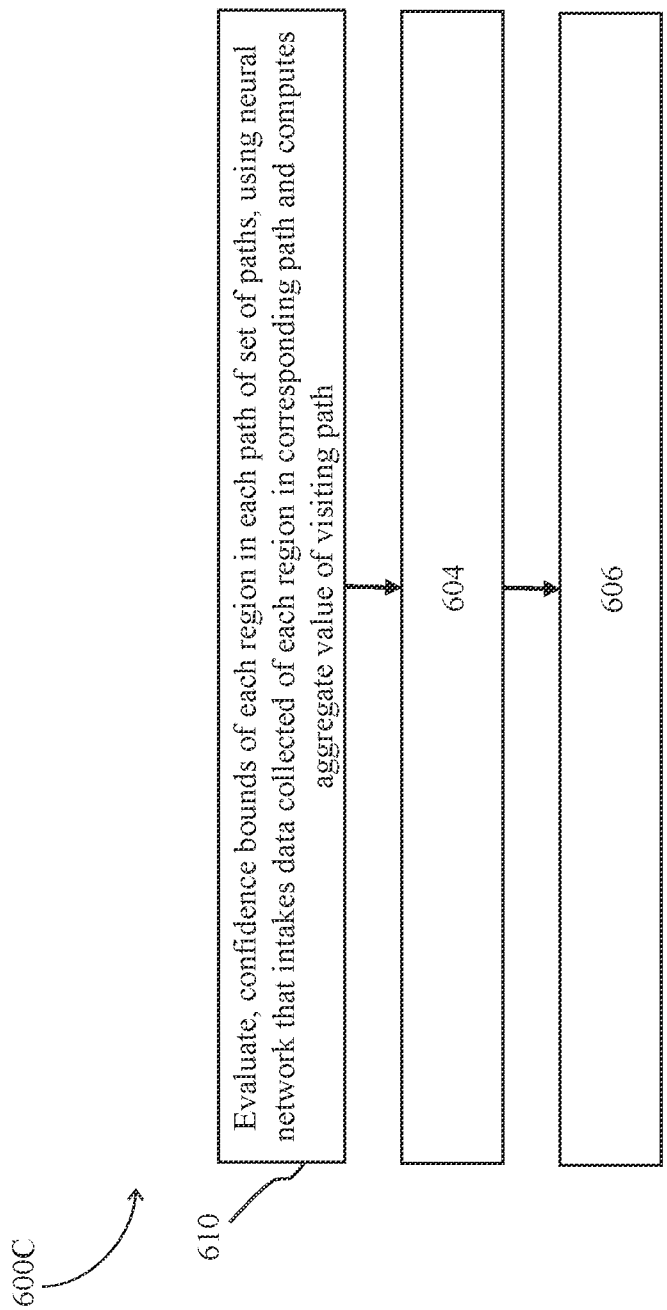
FIG. 6C is a flowchart that illustrates an exemplar second method for the selection of a path from the set of paths to be visited by at least one search agent, in accordance with an embodiment of the disclosure.

FIG. 6C is a flowchart 600C that illustrates an exemplary second method for the selection of a path from the set of paths 118 to be visited by at least one search agent, in accordance with an embodiment of the disclosure. FIG. 6C is explained in conjunction with elements from FIG. 1A, FIG. 1B, FIG. 2A, FIG. 2B, FIG. 3, FIG. 4, FIG. 5, FIG. 6A, and FIG. 6B. With reference to FIG. 6C, there is shown the flowchart 600C. The operations of the exemplary method may be executed by any computing system, for example, by the control system 102 or the processor 104, or the remote server 110 of FIG. 1A. The operations of the flowchart 600C may start at 610.

At 610, the confidence bounds 502 of each region in each path of the set of paths 118 may be evaluated. In an embodiment, the confidence bounds 502 of each region in each path of the set of paths 118 may be evaluated using a neural network. The neural network may output the confidence bounds 502 of each region in the corresponding path of the set of paths 118. The neural network may be trained using machine learning to assign an aggregate value for the confidence bound 502 based on the data collected for each region within the path. Specifically, the weights of the neural network are trained by minimizing a loss function that encodes various desirable behaviors in the generation of the aggregate value, including providing higher evaluations for more informative paths, aggregating the confidence bounds of the regions, etc.

Figure 6D:
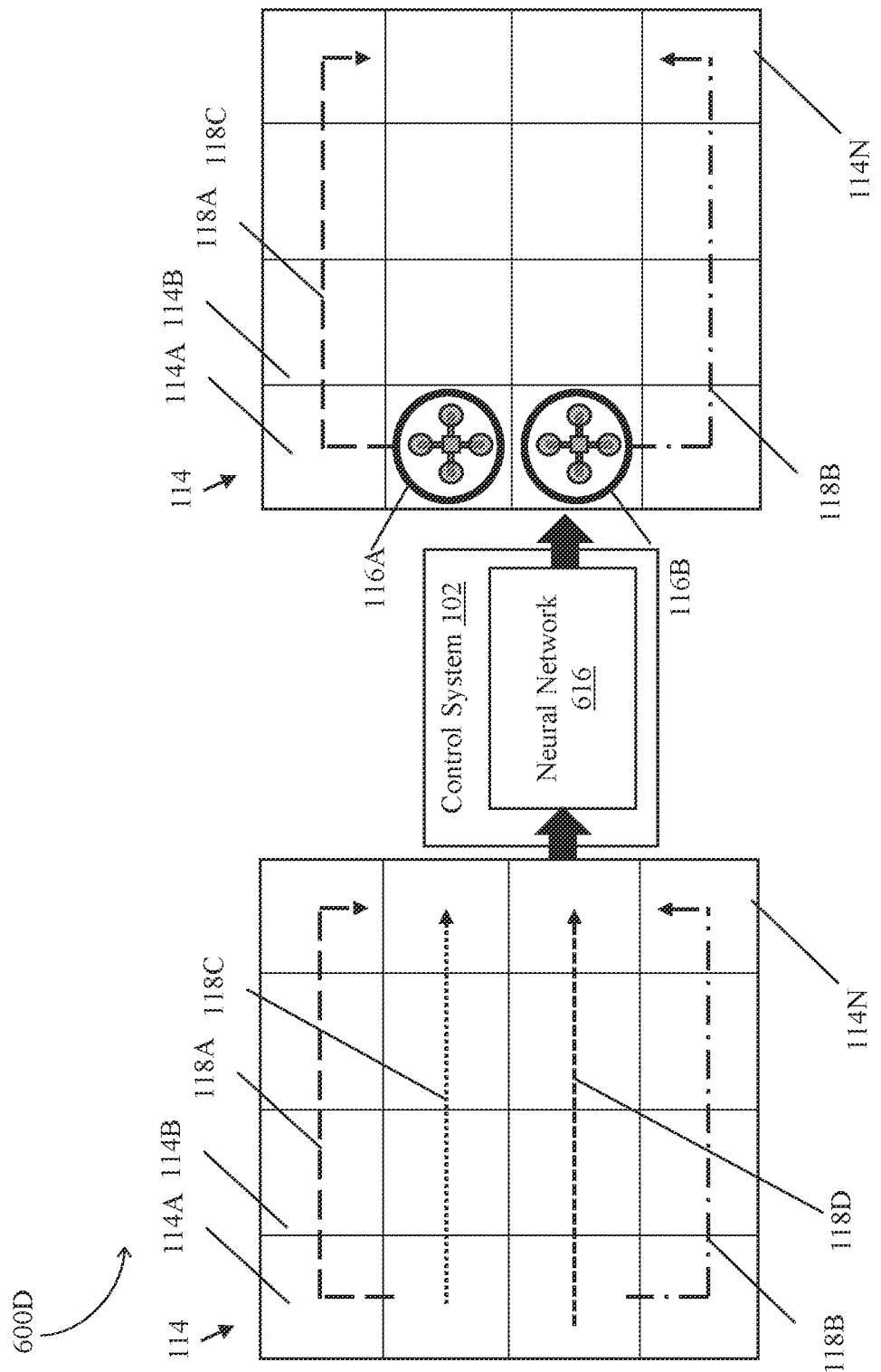
FIG. 6D depicts a diagram to illustrate an exemplar scenario for selecting paths to be visited by at least one search agent, in accordance with an embodiment of the disclosure.

FIG. 6D depicts a diagram to illustrate an exemplary scenario 600D for selecting paths to be visited by at least one search agent, in accordance with an embodiment of the disclosure. FIG. 6D is explained in conjunction with elements from FIG. 1A, FIG. 1B, FIG. 2A, FIG. 2B, FIG. 3, FIG. 4, FIG. 5, FIG. 6A, FIG. 6B, and FIG. 6C. With reference to FIG. 6D, there is shown an exemplary scenario 600D. The exemplary scenario 600D may include the control system 102, the search environment 114 partitioned into a set of regions 114A-114N, and the set of search agents 116 including the first search agent 116A, and the second search agent 116B. With reference to FIG. 6D, there is further shown a neural network 616, and the set of paths 118 including the first path 118A, the second path 118B, the third path 118C and the fourth path 118D.

The neural network 616 may be a computational network or a system of artificial neurons, arranged in a plurality of layers, as nodes. The plurality of layers of the neural network 616 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network 616. Outputs of each hidden layer may be coupled to inputs of at least one node in other layers of the neural network 616. Node(s) in the final layer may receive inputs from at least one hidden layer to output a result. The number of layers and the number of nodes in each layer may be determined from hyper-parameters of the neural network 616. Such hyper-parameters may be set before or while training the neural network 616 on a training dataset.

Each node of the neural network 616 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network 616. All or some of the nodes of the neural network 616 may correspond to a same or a different same mathematical function.

In training of the neural network 616, one or more parameters of each node of the neural network 616 may be updated based on whether an output of the final layer for a given input (from the training dataset) matches a correct result based on a loss function for the neural network 616. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network 616 may include electronic data, such as, for example, a software program, code of the software program, libraries, applications, scripts, or other logic or instructions for execution by a processing device, such as processor 104. The neural network 616 may include code and routines configured to enable a computing device, such as the control system 102 to perform one or more operations. Additionally or alternatively, the neural network 616 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network 616 may be implemented using a combination of hardware and software.

The system 102 may be configured to evaluate the confidence bounds 502 of each region in each path of the set of paths 118 using the neural network 616. In an embodiment, the confidence bounds 502 of each region in each path of the set of paths 118 may be provided as an input to the neural network 616. The neural network 616 may intake the confidence bounds 502 of each region in the corresponding path of the set of paths 118.

FIG. 6E is a flowchart 600E that illustrates an exemplary third method for the selection of a path from the set of paths 118 to be visited by at least one search agent, in accordance with an embodiment of the disclosure. FIG. 6E is explained in conjunction with elements from FIG. 1A, FIG. 1B, FIG. 2A, FIG. 2B, FIG. 3, FIG. 4, FIG. 5, FIG. 6A, FIG. 6B, FIG. 6C, and FIG. 6D. With reference to FIG. 6E, there is shown a flowchart 600E. The operations of the exemplary method may be executed by any computing system, for example, by the control system 102 or the processor 104 of FIG. 1A. The operations of the flowchart 600E may start at 618.

At 618, a selection between a most-promising path criterion and a minimal-movement criterion may be made. In an embodiment, the processor 104 may be configured to probabilistically select between different selecting criteria including the most-promising path criterion and a minimal-movement criterion. The most-promising path criterion may correspond to the selection of the most promising path from the set of paths 118 to be traversed by at least one search agent of the set of search agents 116. In an embodiment, the most-promising path criterion may be similar to an execution of a multi-arm bandit (MAB) algorithm, where the path is selected based on an aggregate function of the upper confidence bounds. Since the goal of some embodiments is to quickly identify the interesting regions, selecting paths with the high upper confidence bounds introduces optimism in the face of uncertainty that enables providing probabilistic guarantees of performance.

The minimal-movement criterion may correspond to the execution of a label-then-move search. The label-then-move search may be a naive search algorithm that may traverse the search environment 114 and moves out of each region only after classifying it. But, such an approach may require minimal movements from the search agents. A drawback of label-then-move search is that it may ignore the data collected online in deciding where to sense next. Subsequently, the label-then-move search may take a long time to identify all the interesting regions. Some embodiments are based on the intuition that a combination of the multi-arm bandit search method and the label-then-move search method may get synergy in reducing both the time and cost of the search operation.

In an embodiment, the probability of selection between the most-promising path criterion and the minimal-movement criterion may be a biased probability. The biased probability may refer to a situation where the likelihood of certain outcomes or events is intentionally or unintentionally skewed in favor of one particular outcome. In an embodiment, the designer may choose the probability of selection to be biased towards either the most-promising path criterion, the minimal-movement criterion, or be unbiased.

In an embodiment, a bias of the biased probability varies between at least some control steps. The processor 104 may be further configured to update the bias based on the likelihood of interest at different regions of the set of regions 114A-114N in the search environment 114.

At 620, at least one path to be visited by the set of search agents 116 may be selected. In an embodiment, the processor 104 may be configured to select the at least one path to be visited by the set of search agents 116 based on the selected criterion. In case of the most-promising path criterion, the selected path may correspond to the path for which the probability of classification of at least one region may be higher as compared to other paths. In another embodiment, if the minimum-movement criterion is selected, the path that corresponds to a nearest path with minimum cost constraints may be selected. In an embodiment, the processor 104 may be further configured to update the confidence bounds 502 of the different regions with a neural network that may be trained with machine learning to produce the biased probability.

FIG. 7A is a flowchart 700A that illustrates an exemplary first method for updating confidence bounds 502 of at least one region of the set of regions 114A-114N of the search environment 114, in accordance with an embodiment of the disclosure. FIG. 7A is explained in conjunction with elements from FIG. 1A, FIG. 1B, FIG. 2A, FIG. 2B, FIG. 3, FIG. 4, FIG. 5, FIG. 6A, FIG. 6B, FIG. 6C, and FIG. 6D.

With reference to FIG. 7A, there is shown the flowchart 700A. The operations of the exemplary method may be executed by any computing system, for example, by the control system 102 or the processor 104, or the remote server 110 of FIG. 1A. The operations of the flowchart 700A may start at 702.

At 702, a pre-determined number of measurements may be received. In an embodiment, the processor 104 may be configured to receive the pre-determined number of measurements associated with the first region 114A within the selected first path 118A. The pre-determined number of measurements may correspond to a minimum number of measurements that may be required to update the confidence bounds 502 associated with the first region 114A. In an embodiment, the pre-determined number of measurements may be based on a type of problem statement and may change based on the problem statement. For example, for a first problem statement, the pre-determined number of measurements may be ten whereas for a second problem statement, the pre-determined number of measurements may be 25. In an embodiment, the pre-determined number of measurements may be collected by the first search agent 116A of the set of search agents 116. In another embodiment, the pre-determined number of measurements may be collected by the search agents other than the first search agent 116A in the set of search agents 116 or a combination thereof.

As discussed above, each measurement of the pre-determined number of measurements may correspond to sensor data that may be captured by the one or more noisy sensors embedded in the set of search agents 116. For example, in the case of the search-and-rescue operations, the measurement may correspond to an image of the corresponding region captured by an image sensor embedded within the set of search agents 116.

At 704, the confidence bounds 502 of the probabilistic classification 110A of the first region 114A may be updated. In an embodiment, the processor 104 may be configured to update the confidence bounds 502 of the probabilistic classifications 110A of the first region 114A based on the collected pre-determined number of measurements. As discussed above, the confidence bounds 502 of the first region 114A may include the upper confidence bound 502A and the lower confidence bound 502B.

In an embodiment, the confidence bounds 502 of the first region 114A may be updated using at least one concentration inequality. The concentration inequality may refer to a mathematical concept that may provide bounds on the variability of a random variable around its mean. In an embodiment, the confidence bounds 502 of the first region 114A may be updated using the bounds given in (1) and (2). In another embodiment, the confidence bounds 502 of the first region 114A may be updated using the Hoeffding's bound that may characterize an interval around the mean constructed using the measurements that may be guaranteed to contain the true mean with a user-specified confidence probability. In another embodiment, other concentration inequalities such as Chernoff bound, Azuma's inequality, McDiarmid's inequality, Bennett's inequality, Bernstein inequalities, and the like may be used to update the confidence bounds 502 of the first region 114A.

FIG. 7B is a flowchart 700B that illustrates an exemplary second method for updating confidence bounds 502 of at least one region of the set of regions 114A-114N of the search environment 114, in accordance with an embodiment of the disclosure. FIG. 7B is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, and FIG. 7A. With reference to FIG. 7B, there is shown the flowchart 700B. The operations of the exemplary method may be executed by any computing system, for example, by the control system 102 or the processor 104, or the remote server 110 of FIG. 1A. The operations of the flowchart 700B may start at 706.

At 706, the processor 104 may be configured to transmit a current value of the confidence bounds 502 of the probabilistic classifications 110A of the first region 114A, a third set of instructions for taking a pre-determined number of measurements of the first region 114A, and a fourth set of instructions for updating the current values of the confidence bounds 502 of the probabilistic classifications 110A of the first region 114A to at least the first search agent 116A. In an embodiment, the current value, the third set of instructions, and the fourth set of instructions may be transmitted via the transceiver 108.

Based on the reception of the third set of instructions, the first search agent 116A of the set of search agents 116 may be configured to capture the pre-determined set of measurements of the first region 114A within the first path 118A of the set of paths 118. Details about the pre-determined set of measurements are provided, for example, in FIG. 7A.

After taking the pre-determined number of measurements of the first region 114A, the first search agent 116A may be configured to update the confidence bounds 502 of the probabilistic classifications 110A of the first region 114A based on the received current value of the confidence bounds 502, the pre-determined number of measurements, and the received fourth set of instructions. As discussed above, the set of instructions for updating the current values of the confidence bounds 502 of the probabilistic classifications 110A of the first region 114A may include instructions to use at least one concentration inequality (such as (1) and (2), or the Hoeffding's bound) to update the current values of the confidence bounds 502. Details about the concentration inequality are provided, for example, in FIG. 5A.

After updating the confidence bounds 502 of the first region 114A, the first search agent 116A may be configured to transmit the updated confidence bounds 502 to the control system 102.

At 708, the updated confidence bounds 502 of the probabilistic classifications 110A of the first region 114A may be received. In an embodiment, the processor 104 may be configured to receive the updated confidence bounds 502 of the probabilistic classifications 110A of the first region 114A from the first search agent 116A via the transceiver 108.

FIG. 8 is a flowchart 800 that illustrates an exemplary method for classifying at least one region of the set of regions 114A-114N of the search environment 114 and pruning the classified region from the corresponding path, in accordance with an embodiment of the disclosure. FIG. 8 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, and FIG. 7B. With reference to FIG. 8, there is shown the flowchart 800. The operations of the exemplary method may be executed by any computing system, for example, by the control system 102 or the processor 104, or the remote server 110 of FIG. 1A. The operations of the flowchart 800 may start at 802.

At 802, the updated confidence bounds 502 of the first region 114A may be compared with a confidence threshold. In an embodiment, the processor 104 may be configured to compare the updated confidence bounds 502 of the first region 114A within the selected first path 118 with the confidence threshold. The updated confidence bounds 502 of the first region 114A may be determined after the pre-determined number of measurements associated with the first region 114A may be received. Details about the updated confidence bounds 502 are provided, for example, in FIG. 7A, and FIG. 7B.

At 804, the first region 114A within the selected first path 118A may be classified. In an embodiment, the processor 104 may be configured to classify the first region 114A within the first path 118A based on the comparison. The first region 114A may be classified as an interesting region or an uninteresting region. Specifically, the control system 102 may be configured to classify the first region 114A as interesting with a high probability whenever the lower confidence bound may be greater than the confidence threshold. Similarly, the control system 102 may classify the first region 114A as uninteresting with a high probability whenever the upper confidence bound may be less than the confidence threshold. Details about the classification of the first region 114A are provided, for example, in FIG. 8 and FIG. 13.

At 806, the first path 118A may be updated. In an embodiment, the processor 104 may be configured to update the first path 118A. The first path 118A may be updated to prune the first region 114A from the first path 118A based on the classification of the first path as the interesting region or the uninteresting region. In case, the first region 114A is not classified as the interesting region or the uninteresting region, the control system 102 may be configured to again repeat the steps described in FIG. 7A or FIG. 7B until the first region 114A is classified as the interesting region or the uninteresting region.

In an embodiment, despite pruning regions that are classified, the set of paths remain unchanged and only the aggregation function in 602 is updated to exclude classified regions. Alternatively, the set of paths are updated as explained in FIG. 9.

Figure 9:
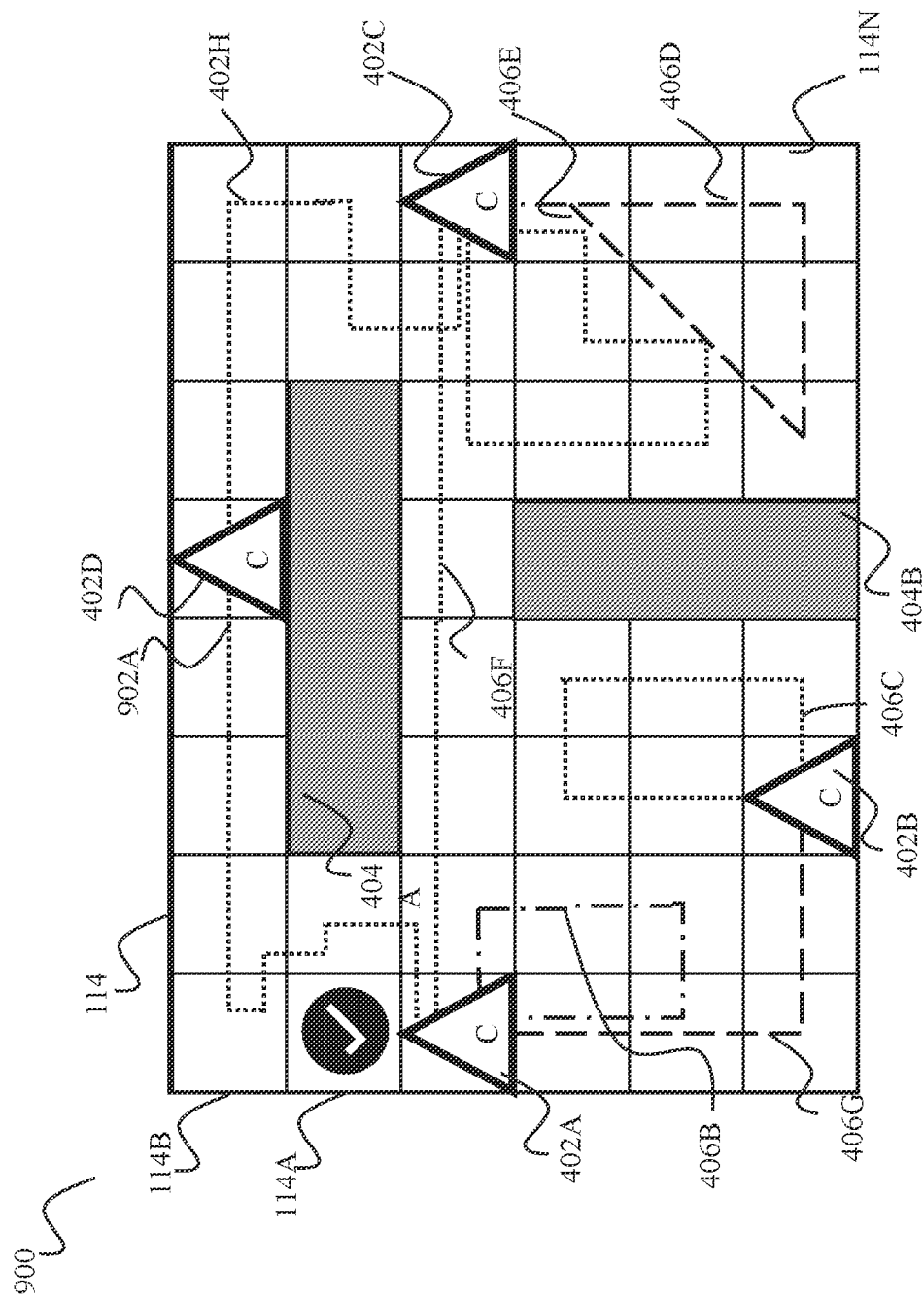
FIG. 9 is a diagram that illustrates an updated set of paths in the search environment based on the classification of the first region, in accordance with an embodiment of the disclosure.

FIG. 9 is a diagram that shows an updated set of paths in the search environment 114 based on the classification of the first region, in accordance with an embodiment of the disclosure. FIG. 9 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, and FIG. 8. With reference to FIG. 9, there is shown a diagram 400 that depicts search environment 114 that may be partitioned into the set of regions 114A-114N. With reference to FIG. 9, there is further shown the one or more pre-designated regions 402, the one or more restricted regions 404, and an updated first path 902A of the set of paths 406.

In an embodiment, the processor 104 may be configured to prune the first region 114A from the first path 902A. As shown in FIG. 9, the updated first path 902A may originate from the first pre-designated region 402A and may terminate at the fourth pre-designated region 402D and may have the path length of 7. Similarly, each region that may be classified may be pruned from their corresponding paths. The method may end when each region is classified as the interesting region or the uninteresting region. Specifically, the termination condition may be met when each region of the set of regions 114A-114N may be classified as the interesting region or the uninteresting region.

Figure 10:
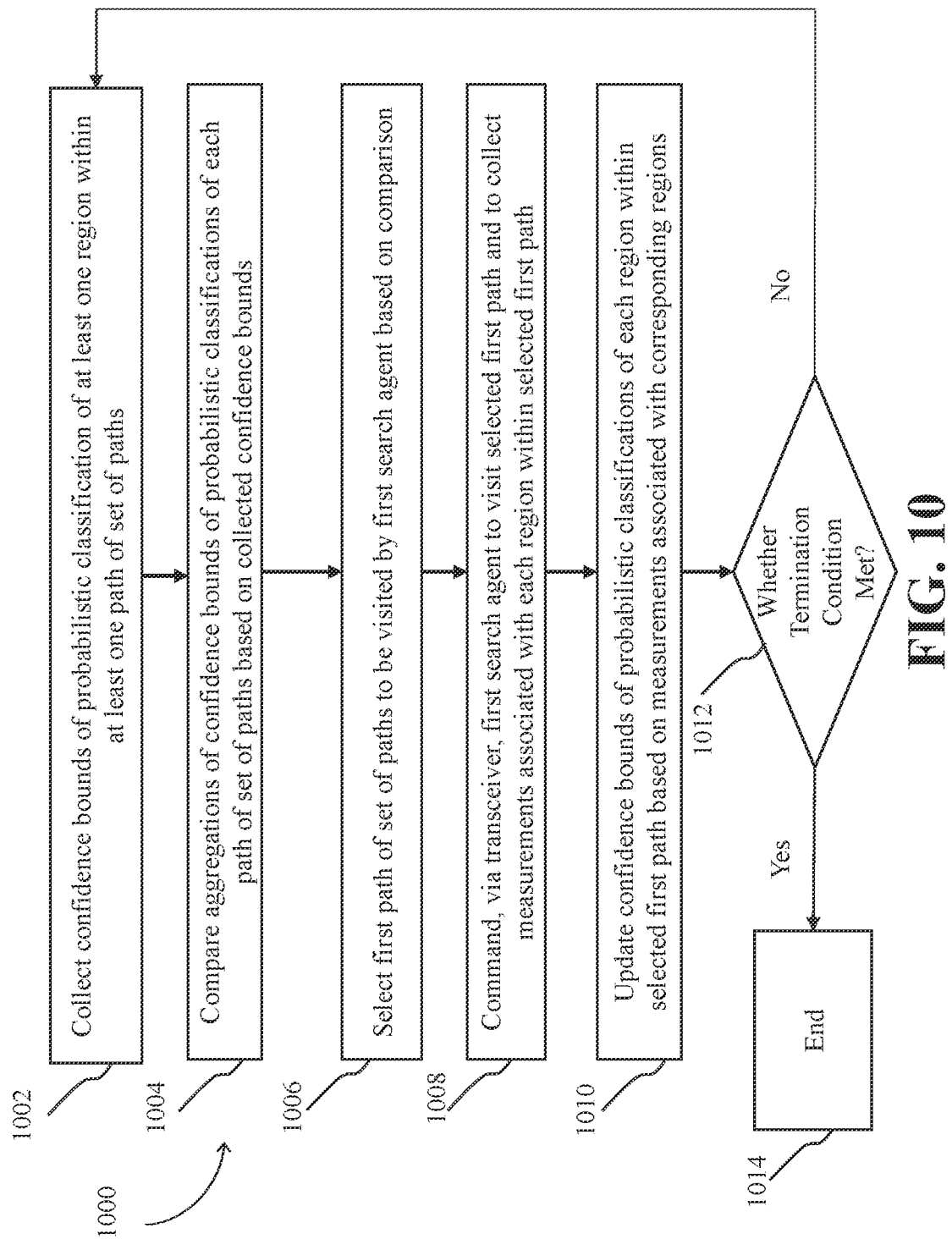
FIG. 10 is a flowchart that illustrates an exemplar method for controlling search agents to perform search with noisy observations and probabilistic guarantees, in accordance with an embodiment of the disclosure.

FIG. 10 is a flowchart 1000 that illustrates an exemplary method for controlling search agents to perform search with noisy observations and probabilistic guarantees, in accordance with an embodiment of the disclosure. FIG. 10 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, and FIG. 9. With reference to FIG. 10, there is shown the flowchart 1000. The operations of the exemplary method may be executed by any computing system, for example, by the control system 102 or the processor 104, or the remote server 110 of FIG. 1A. The operations of the flowchart 1000 may start at 1002.

At 1002, the confidence bounds 502 of the probabilistic classification 110A of at least one region within at least one path of the set of paths 118 may be collected. In an embodiment, the processor 104 may be configured to collect the confidence bounds 502 of the probabilistic classification 110A of at least one region within at least one path of the set of paths 118. In an embodiment, the confidence bounds 502 may be collected from the set of search agents 116. In another embodiment, the processor 104 may be configured to collect the measurements captured by the set of search agents 116 and determine the confidence bounds 502 of the probabilistic classification 110A of at least one region within at least one path of the set of paths 118. Details about the confidence bounds 502 are provided, for example, in FIG. 1A, and FIG. 5.

At 1004, aggregations of the confidence bounds 502 may be compared. In an embodiment, the processor 104 may be configured to compare the aggregations of the confidence bounds 502 of the probabilistic classifications 110A of each path of the set of paths 118 based on the collected confidence bounds 502. In an embodiment, the aggregation of the confidence bounds 502 may be determined based on the application of the pre-determined aggregation function on the set of confidence bounds 502. Details about the comparison of aggregations of the confidence bounds 502 are provided, for example, in FIG. 5.

At 1006, the first path 118A of the set of paths 118 may be selected. In an embodiment, the processor 104 may be configured to select the first path 118A of the set of paths 118 to be visited by the first search agent 116A based on the comparison. In an embodiment, the selection of the first path 118A may be based on a sorted arrangement of the evaluation of the pre-determined aggregation function along each path. In another embodiment, the selection of the first path 118A may be based on a sorted arrangement of the evaluation of the path by a neural network. In another embodiment, the selection of the first path 118A may be based on probabilistic selection between different selecting criteria. Details about the selection of the first path 118A are provided, for example, in FIG. 6A, FIG. 6B, FIG. 6C, FIG. 6D, and FIG. 6E.

In an embodiment, the processor 104 may be configured to select the first path 118A and the second path 118B from the set of paths 118 based on the aggregations of the probabilistic classifications of each of the set of paths 118. The processor 104 may be further configured to control the movement of the first search agent 116A and the second search agent 116B of the set of search agents 116B concurrently on the selected first path 118A and the second path 118B to take measurements associated with the corresponding regions within the first path 118A and the second path 118B.

At 1008, the first search agent 116A may be commanded. In an embodiment, the processor 104 may be configured to command, via the transceiver 108, the first search agent 116A to visit the selected first path 118A and to collect measurements associated with each region within the selected first path 118A. The collected measurements to be collected may be based on the problem statement. Details about the measurements are provided, for example, in FIG. 7A.

At 1010, the confidence bounds 502 may be updated. In an embodiment, the processor 104 may be configured to update the confidence bounds 502 of the probabilistic classifications 110A of each region within the selected first path 118A based on the measurements associated with the corresponding regions. Details about updating the confidence bounds 502 are provided, for example, in FIG. 7A and FIG. 7B.

At 1012, it may be determined whether a termination condition is met or not. The termination condition may correspond to the classification of each region of the set of regions 114A-114N in the search environment 114. In case each region is classified, it may be deemed that the termination condition is met, and the control may pass to end 1014. Otherwise, the control may pass to 1002.

Figure 11:
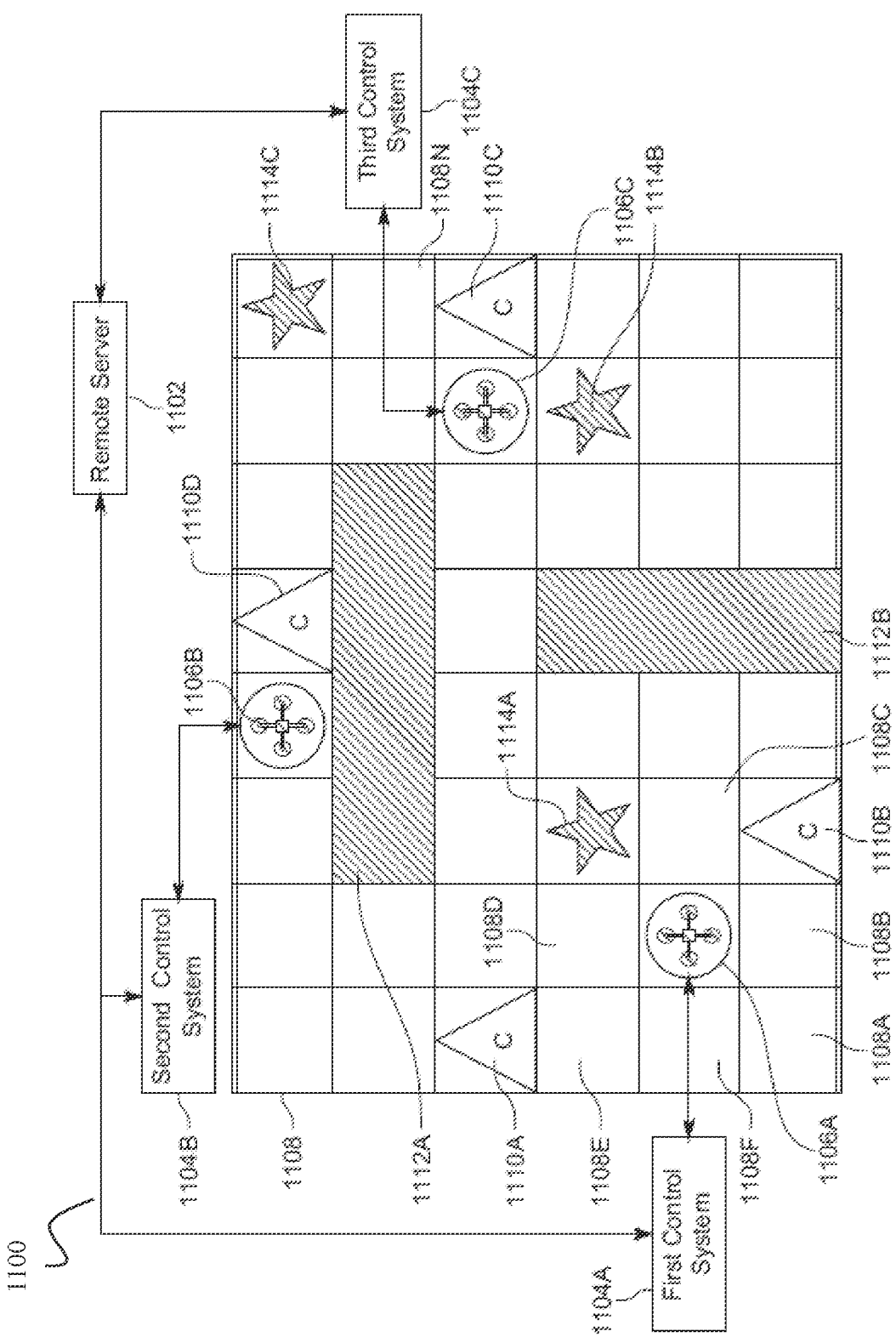
FIG. 11 is a network environment for a remote server controlling search agents to perform a search with noisy observations and probabilistic guarantees, in accordance with an embodiment of the disclosure.

FIG. 11 is a network environment for a remote server controlling search agents to perform a search with noisy observations and probabilistic guarantees, in accordance with an embodiment of the disclosure. FIG. 11 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, and FIG. 10. With reference to FIG. 10, there is shown a network environment 1100 that may include a remote server 1102, a first control system 1104A, a second control system 1104B, a first control system 1104C (hereinafter referred to as a set of control systems 1104). controlling a first search agent 1106A, a second search agent 116B, a third search agent 116C (hereinafter referred to as a set of search agents 1106) deployed in a search environment 1108 partitioned into a set of regions 1108A-1108N.

In an embodiment, the search environment 1108 may further include a first pre-designated region 1110A, a second pre-designated region 1110B, a third pre-designated region 1110C, and a fourth pre-designated region 1110D (hereinafter referred to as one or more pre-designated regions 1110). There is further shown a first restricted region 1112A, and a second restricted region 1112B (hereinafter referred to as one or more restricted regions 1112), and a first interesting region 1114A, a second interesting region 1114B, and a third interesting region 1114C (hereinafter referred to as one or more interesting regions 1114).

The remote server 1102 may be an exemplary embodiment of the remote server 110 of FIG. 1A. Each of the set of control systems 1104 may be an exemplary embodiment of the control system 102 of FIG. 1A. The set of search agents 1106 may be an exemplary embodiment of the set of search agents 116 of FIG. 1A. The search environment 1108 may be an exemplary embodiment of the search environment 114 of FIG. 1A. The set of regions 1108A-1108N may be an exemplary embodiment of the set of regions 114A-114N of FIG. 1A. The one or more pre-designated regions 1110 and the one or more restricted regions 1112 may be an exemplary embodiment of the one or more restricted regions 402 and the one or more restricted regions of 404 FIG. 4 respectively.

The set of control system 1104 may include the first control system 1104A controlling the first search agent 1106A of the set of search agents 1106. Similarly, the set of control systems 1104 may further include the second control system 1104B and the third control system 1104C controlling the second search agent 1106B and the third search agent 1106C of the set of search agents 1106. The one or more pre-designated regions 1110 may include the first pre-designated region 1110A, the second pre-designated region 1110B, the third pre-designated region 1110C, and the fourth pre-designated region 1110D. The one or more restricted regions 1112 may include the first restricted region 1112A, and the second restricted region 1112B. Similarly, the one or more interesting regions 1114 may include the first interesting region 1114A, the second interesting region 1114B, and the third interesting region 1114C.

In an embodiment, the remote server 1102 may be configured to partition the search environment 1108 in the set of regions 1108A-1108N. In an embodiment, each region of the set of regions 1108A-1108N may be of the same dimensions and same shapes. In another embodiment, each region of the set of regions 1108A-1108N may be of different dimensions and different shapes. Each of the one or more pre-designated regions 1110 may correspond to an energy refueling station, a calibration station, a service station, or a docking station. Each of the one or more restricted regions 1112 may have to be avoided by the set of search agents 1106 and the one or more interesting regions 1114 may be classified as interesting regions by the remote server 1102 or by at least one control system of the set of control system 1104. In another embodiment, the one or more interesting regions 1114 may correspond to a region that may include at least one object of interest. In an embodiment, if the region includes at least one object of interest, the region may be deemed as an interesting region whereas if the region does not include at least one object of interest, then the region may be deemed as an uninteresting region. For example, in the case of search-and-rescue operations, the object of interest may be animated objects such as humans, or animals.

In an embodiment, the following modeling assumptions may be made to make the search problem tractable and practical.

It may be assumed that the search environment 1108 may be described by the set of regions 1108A-1108N.

Each of the set of search agents 1106 may be constrained to move only to their neighboring grid cells (or regions) at any given time. For example, the first search agent 1106A may be able to move to regions 1108A, 1108B, 1108C, 1108D, 1108E, or 1108F or to the second pre-designated region 1110B or to any interesting region of the one or more interesting regions 1114.

The movement of each of the set of search agents 1106 due to the energy requirements and no-fly-zone requirements may be constrained to the set of paths that includes a sequence of regions to visit, that:

a. Originate from one of the one or more pre-designated regions 1110, and b. Terminate at one of the one or more pre-designated regions 1110, and c. Are no longer than a user-specified maximum path length 'T' and d. Do not pass through the one or more restricted regions 1112.

e. Each path of the set of paths that satisfies the requirements 3a, 3b, 3c, and 3d may be referred to as a feasible path and may be included in the set of paths 114.

The set of search agents 1106 may communicate easily with the remote server 1102 or their corresponding control system of the set of control systems 1104.

Figure 12:
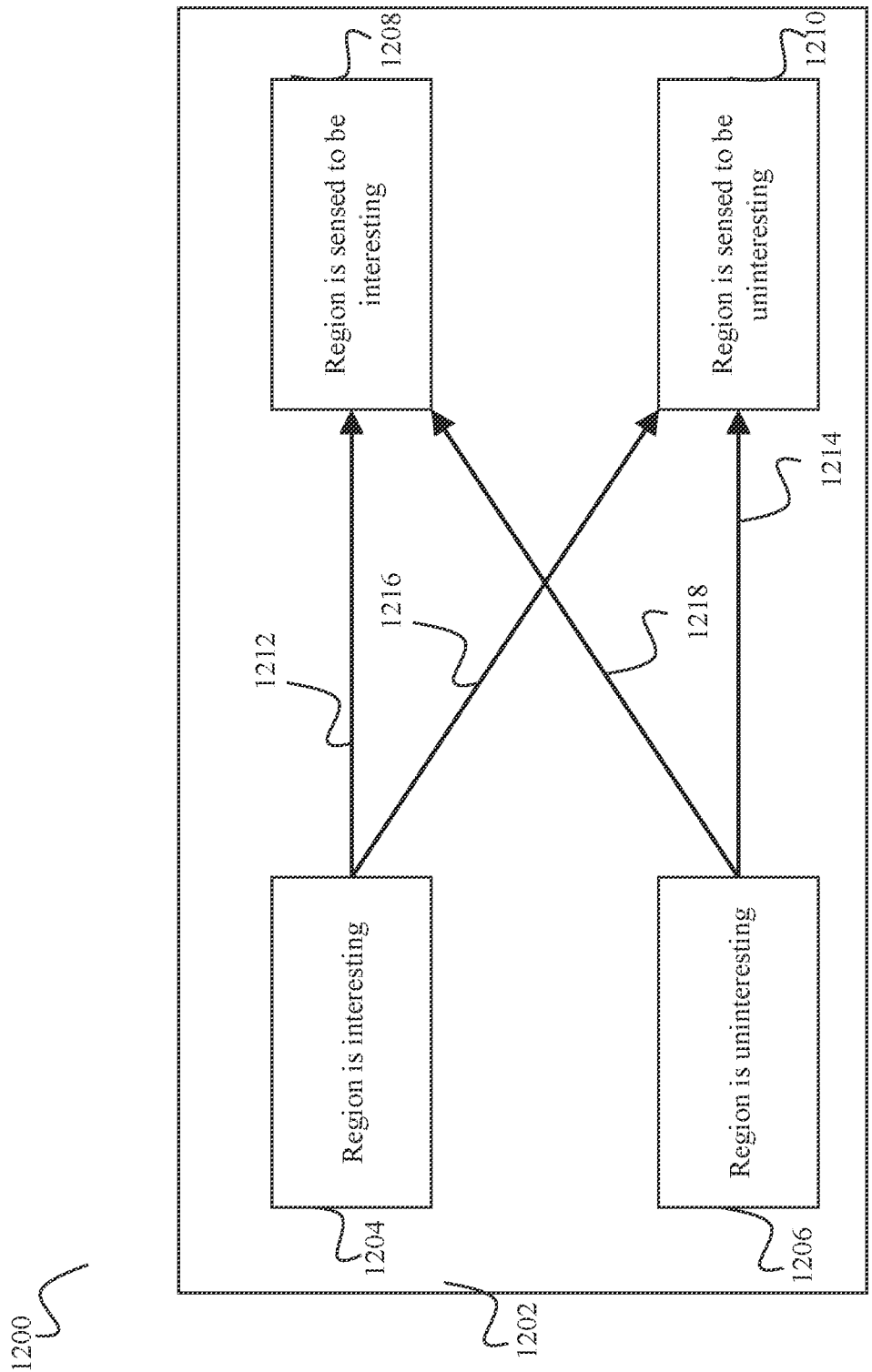
FIG. 12 illustrates the sensing assumptions for the classification of regions within the search environment, in accordance with an embodiment of the disclosure.

FIG. 12 illustrates the sensing assumptions for the classification of regions within the search environment, in accordance with an embodiment of the disclosure. FIG. 11 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, FIG. 10, and FIG. 11. With reference to FIG. 12, there is shown a diagram 1200 of a sensing block 1202 integrated within each of the set of control systems 1104 or the remote server 1102. Each region (or the grid cell) visited by the set of search agents 1106 may be either an interesting region or an uninteresting region. In an embodiment, each region of the set of regions 1108A-1108N may be of a pre-determined dimension. The one or more noisy sensors embedded within the set of search agents 1106 may be controlled by the remote server 1102 via the set of control systems 1104 to capture measurements associated with the corresponding region and transmit the captured measurements to the remote server 1102 via the set of search agents 1106. The remote server 110 may classify each region of the set of regions 1108A-1108N in the search environment 1108 as the interesting region or the uninteresting region based on the captured measurements and/or the confidence bounds constructed.

For example, in the search-and-rescue operation, the one or more noisy sensors may include the image capture sensor that may be installed on at least one of the set of search agents 1106. The remote server 110 may control the image capture sensor to capture one or more images (i.e. the measurements) of the region upon visiting the corresponding region. The region may be interesting (humans that need rescuing are present in the area) 1204 or uninteresting (no humans that need rescuing are present in the area) 1206.

In an embodiment, the remote server 1102 may be configured to execute an image classification algorithm to determine whether one or more humans may be visible in the captured one or more images, and consequently decide if the corresponding region may be sensed to be interesting 1208 or uninteresting 1210. In another embodiment, the image classification algorithm may be executed on the set of search agents 1106. However, the captured one or more images may be of a low resolution due to cost and weight requirements on the image capture sensor on the set of search agents 1106, and additionally, the image classification algorithm used may produce erroneous results. Consequently, the sensing block 1202 may provide an accurate inference 1214 and 1212 or an inaccurate inference 1216 and 1218.

It may be hard to obtain the likelihood of the occurrences of 1212, 1214, 1216, and 1218, since the likelihood of the occurrences may depend on a variety of factors including a quality of the image capture sensor and an accuracy of the image classification algorithm. It may be noted that some of the works known in the art assume the knowledge of such likelihoods, whereas the present disclosure focuses on the case where these likelihoods are apriori unknown.

It may also be assumed that whether the region may be sensed (or classified) to be interesting or uninteresting may be based on a Bernoulli random variable associated with that region. The Bernoulli random variable may be a random variable that may return either 0 or 1. The remote server 1102 may denote a likelihood of returning 1 by a Bernoulli parameter $\mu \in [0, 1]$. The Bernoulli random variable may be considered as a mathematical model of a coin toss that may be biased to yield head (return 1) with probability $\mu$. It may be also known that the mean of the Bernoulli random variable may also be $\mu$.

It may be assumed that each region i in the search environment 1108 may have a Bernoulli random variable attached to it. Additionally, it may be further assumed that the remote server 1102 may not know $\mu_i$ for each region i. Instead, the remote server 1102 assumes that the sensing block 1202 provides realizations of the Bernoulli random variable associated with the region i whenever the set of search agents 1106 visits the corresponding region 'i'.

Therefore, the task of identifying interesting regions in the search environment 1108 may be casted as identifying a first set of regions for which the value of $\mu_i$ may be above a user-defined pre-specified confidence threshold $\theta$.

Figure 13:
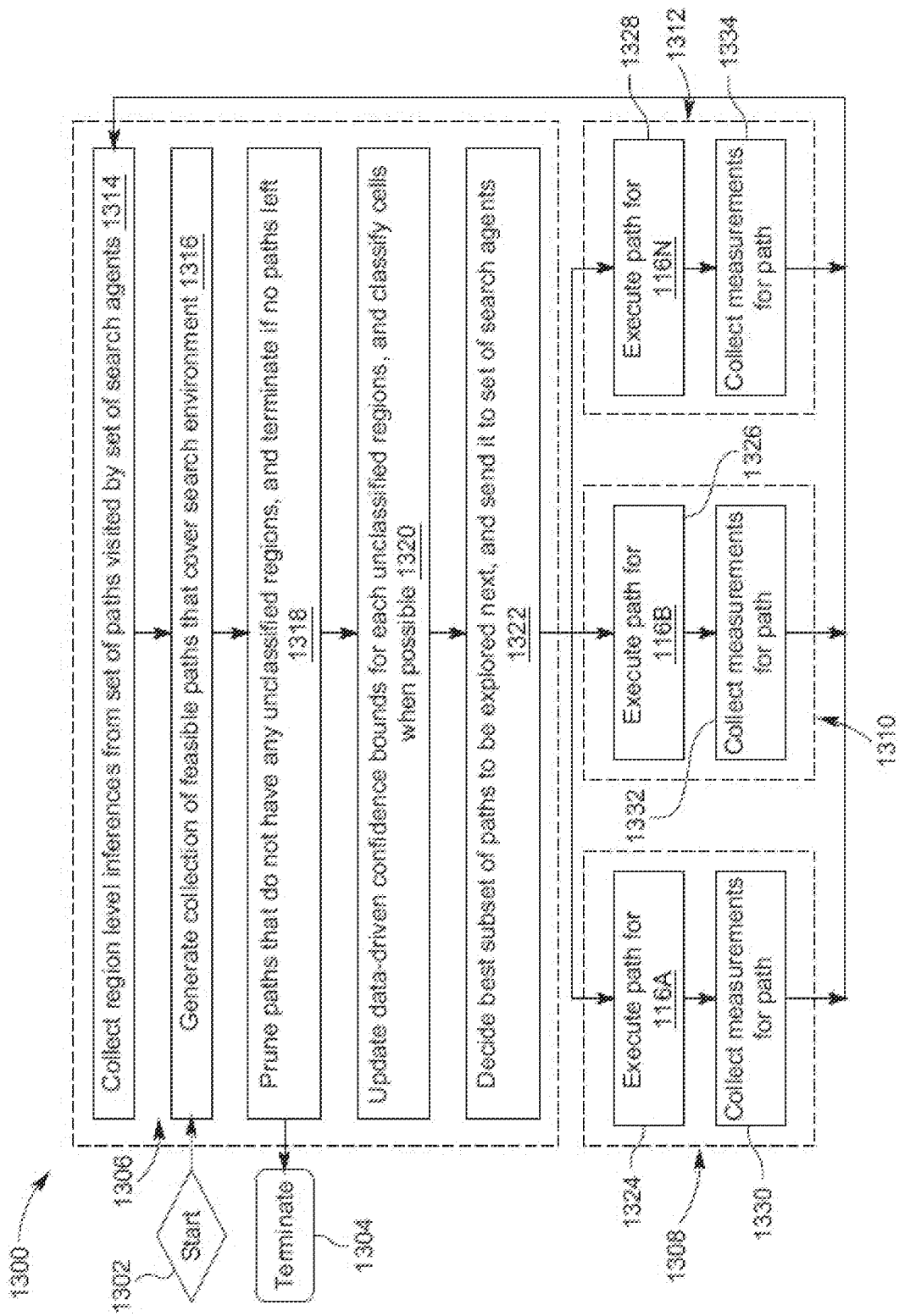
FIG. 13 is a flowchart that illustrates an exemplar method for controlling search agents to perform search with noisy observations, in accordance with an embodiment of the disclosure.

FIG. 13 is a flowchart 1300 that illustrates an exemplary method for controlling search agents to perform search with noisy observations, in accordance with an embodiment of the disclosure. FIG. 13 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, FIG. 10, FIG. 11, and FIG. 12. With reference to FIG. 13, there is shown the flowchart 1300. The operations of the exemplary method may be executed by any computing system, for example, by the control system 102 or the processor 104, or the remote server 110 of FIG. 1A. The operations may start at block 1302 and may terminate at block 1304. The flowchart 1300 may include multiple blocks such as a first block 1306, and a set of blocks that may include a block 1308, a block 1310, and a block 1312.

The first block 1306 corresponds to the algorithmic steps that may be performed by the remote server 110, and each of the set of blocks (or the block 1308, 1310, and 1312) corresponds to the algorithmic steps that may be performed by the set of search agents 1106 using their respective set of control systems 1104.

Each of the set of blocks (or the blocks 1308, 1310, and 1312) may expect an assignment of a (possibly unique) feasible path to each of the set of search agents 1106 respectively from the first block 1306. As discussed above, the feasible paths may correspond to the paths that satisfy requirements 3a, 3b, 3c, and 3d mentioned in the description of FIG. 11. Upon reception of the feasible path, the set of control systems 1104 may be configured to command the set of search agents 1106 to traverse the feasible path by visiting at least one region in the feasible path in an order (or sequence) that may be prescribed by the feasible paths in 1324, 1326, and 1328. The set of control systems 1104 may be assumed to be well-designed and may be capable of handling waypoint tracking tasks as well as collision avoidance with other search agents. Details about the assignment of the paths are provided, for example, in FIGS. 6A, 6C, and 6E.

The set of search agents 1106 at each visited region may collect a user-specified number of observations or inferences using the sensing block 1202 at 1330, 1332, and 1334. Specifically, the sensing block 1302 may return a realization of the corresponding Bernoulli random variable (tosses of the corresponding biased coin) that may be stored by the set of control systems 1104, to be subsequently sent back to the remote server 1102.

By design, the feasible paths may terminate at the one or more pre-designated regions 1110. The set of control systems 1104 may further control the set of search agents 1106 to charge the set of search agents 1106 and wait for the new feasible path to be assigned by the remote server 1102.

In an embodiment, the remote server 1102 may be configured to store a set of lists to execute the algorithm in the first block 1306. The set of lists may include a first set of unclassified regions, a second set of regions that may be classified as interesting, and a third set of regions that may be classified as uninteresting.

Next, at 1318, given the set of paths, the remote server 1102 may be configured to prune away paths that may include only classified regions. Any path that only has the classified regions may be deemed redundant and may be removed from consideration without affecting the performance of the set of search agents 1106. Consequently, if all paths in the collection are removed, the algorithm in the block 1306 terminates. Details about the pruning of the paths are provided, for example, in FIG. 8.

Assuming that there are non-trivial paths left in the set of paths, the algorithm in the block 1306 proceeds to construct data-driven confidence bounds 502 for each region at 1320. The confidence bounds 502 may correspond to scalar values that may provide optimistic and pessimistic estimates of the Bernoulli parameter $\mu_i$ associated with the region i in the feasible paths. The optimistic estimates may be referred to as the upper bounds on $\mu_i$, and may be constructed using the past observations at the respective regions. Such optimistic estimates may be referred to as an upper confidence bounds (UCB) 502A and may be denoted by $UCB_i$ for the region (i). Similarly, the pessimistic estimates are lower bounds on $\mu_i$, and are also constructed using the past observations at the respective regions. Such pessimistic estimates may be referred to as a lower confidence bounds (LCB) 502B and may be denoted by $LCB_i$ for the region (i). Examples of these confidence bounds include (1) and (2), or any other confidence bound constructed from concentration inequalities like the Hoeffding's bound.

The remote server 1102 may be configured to classify the region as interesting with a high probability whenever $LCB_i \geq \theta - \in$, for a small tolerance $\in > 0$. Similarly, the remote server 1102 may be configured to classify the region as uninteresting with a high probability whenever $UCB_i \leq \theta + \in$, for a small tolerance $\in > 0$. It may be an object of some embodiments to construct these bounds using data and the tolerances. In some embodiments, the bounds $\theta - \in$ and $\theta + \in$ are confidence thresholds as discussed in FIG. 1A, FIG. 5, and FIG. 8. Additional details about the confidence bounds are provided, for example, in FIG. 5.

At block 1322, the remote server 1102 may be configured to identify the best subset of paths to assign to the search team (the set of search agents 1106) to execute. Specifically, at block 1322, the remote server 1102 aggregates the $UCB_i$ among the feasible paths and selects the top 'N' paths, for a search team of 'N' search agents. One option to aggregate these upper confidence bounds 502 may be to consider the maximum among the regions in a path. The remote server 1102 further transmits information about these paths to the respective search agent for execution.

The control system 102 may command the set of search agents to visit the selected top 'N' paths and collect the measurements associated with each region within the selected first path at block 1314. The control system 102 may be configured to iteratively repeat the algorithm from block 1316 until each regions in the search environment is classified as either the interesting region or the uninteresting region.

Figure 14A:
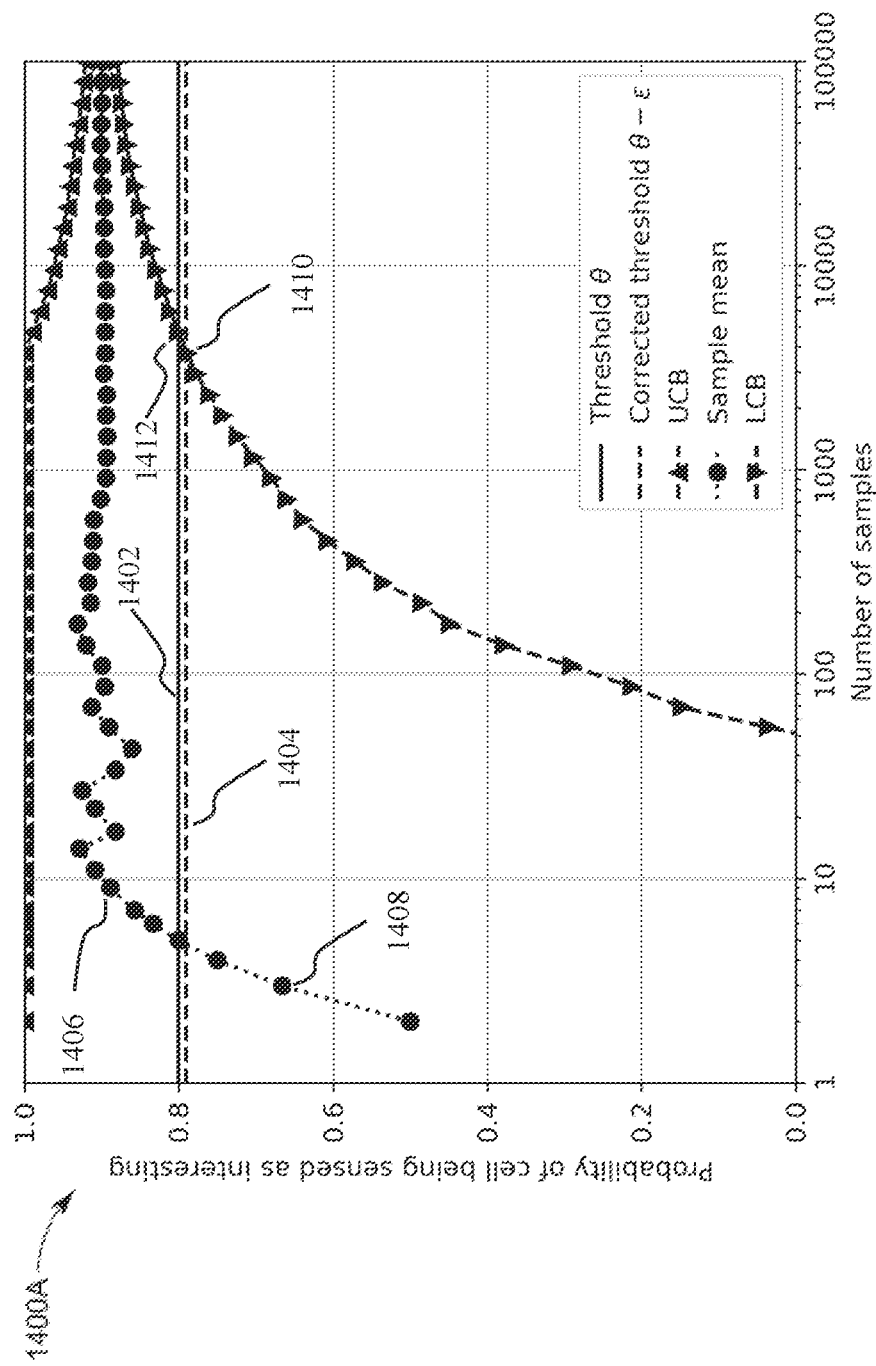
FIG. 14A is a graph that illustrates a convergence of the confidence bounds with an increasing number of realizations for a region that may have a high likelihood of being sensed, in accordance with an embodiment of the disclosure.

FIG. 14A is a graph that illustrates a convergence of the confidence bounds 502 with an increasing number of realizations for a region that may have a high likelihood of being sensed, in accordance with an embodiment of the disclosure. FIG. 14A is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, FIG. 10, FIG. 11, FIG. 12, and FIG. 13. With reference to FIG. 14A, there is shown a graph 1400A.

In an embodiment, the remote server 1102 may set a confidence threshold $\theta = 0.8$, a tolerance $\in = 0.01$, a probability of unreliability $\delta = 10^{-4}$, and a number of regions to be N=100. Consequently, while 1402 may correspond to the confidence threshold $\theta$, the remote server 1102 may be configured to use $\theta - \in$, the corrected confidence threshold 1404, to enable probabilistic guarantees of performance.

The remote server 1102 may be configured to set the apriori unknown Bernoulli parameter $\mu = 0.9$, which implies that the region corresponds to the interesting region. The sample mean 1406 may converge towards $\mu$ as the number of samples increases. However, the sample mean may be an unreliable estimator of whether the region may be interesting or not. For example, at 1408, the remote server 1102 may incorrectly classify the region as uninteresting since the sample mean may be below $\theta$. Specifically, after collecting a few thousand of samples (beyond 1410), it may be deemed confidently that the region may be interesting despite the uncertainty in the data. It may be noted that the LCB crosses the threshold $\theta$ at 1412, but the remote server 1102 may declare the region as interesting earlier, when LCB crosses the corrected threshold $\theta - \in$ at 1410 to achieve probabilistic guarantees of performance. While reducing the tolerance $\in$ yields more accurate classification, it comes at the cost of requiring more samples.

Figure 14B:
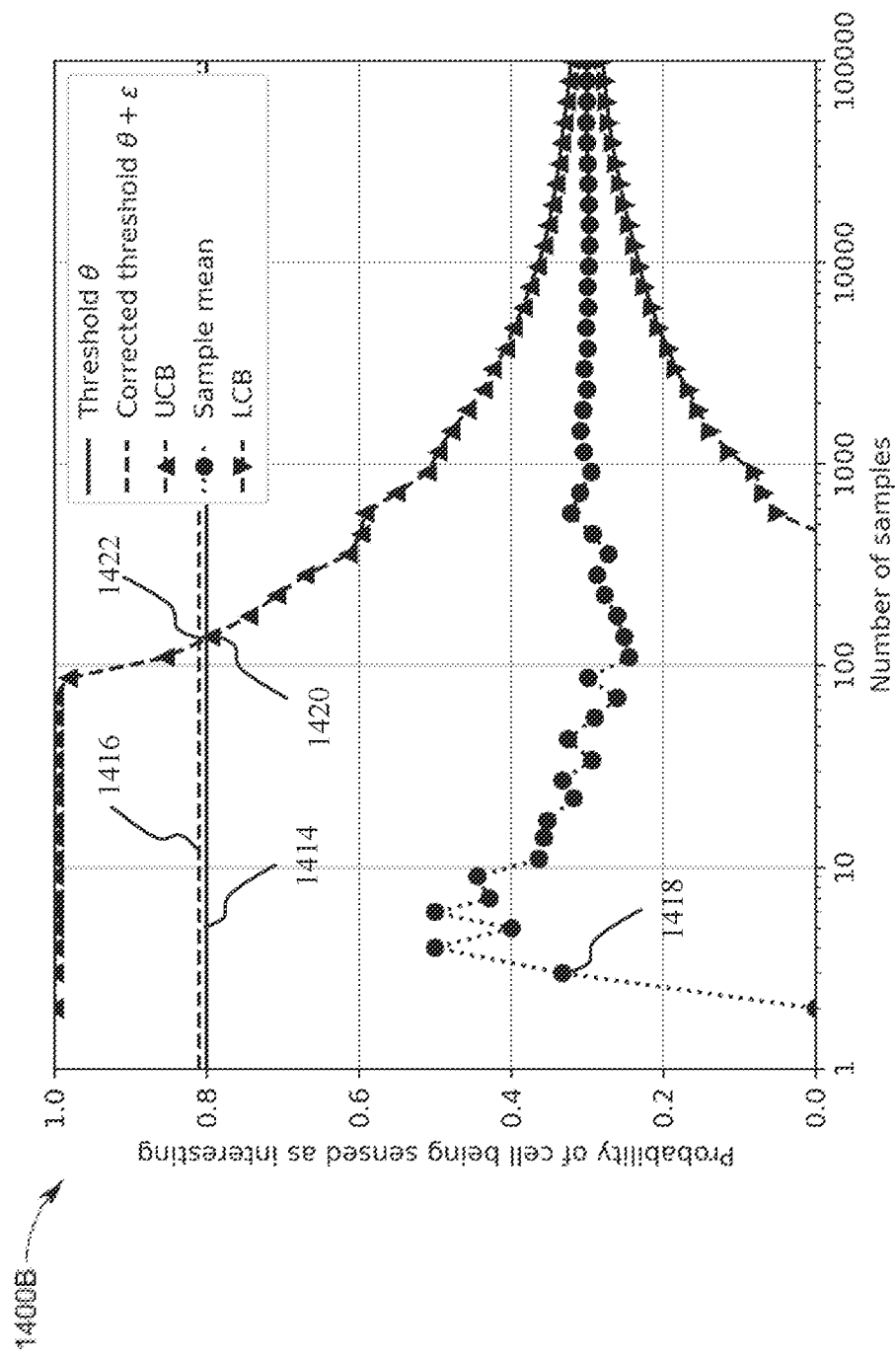
FIG. 14B is a graph that illustrates a convergence of the confidence bounds with an increasing number of realizations for a region that may have a low likelihood of being sensed, in accordance with an embodiment of the disclosure.

FIG. 14B is a graph that illustrates a convergence of the confidence bounds 502 with an increasing number of realizations for a region that may have a low likelihood of being sensed, in accordance with an embodiment of the disclosure. FIG. 14B is explained in conjunction with elements from FIG. 1A, FIG. 1B, FIG. 2, FIG. 3, FIG. 4, FIG. 5A, FIG. 5B, FIG. 6, FIG. 7, FIG. 8A, FIG. 8B, FIG. 8C, FIG. 9, FIG. 10, FIG. 11, FIG. 12, FIG. 13, and FIG. 14A. With reference to FIG. 14B, there is shown a graph 1400B.

In an embodiment, the remote server 1102 may set a confidence threshold $\theta = 0.8$, tolerance $\in = 0.01$, probability of unreliability $\delta = 10^{-4}$, and a number of regions to be N=100. Consequently, while 1414 may correspond to the confidence threshold $\theta$, the remote server 1102 may be configured to use $\theta + \in$, the corrected confidence threshold 1416, to enable probabilistic guarantees of performance.

The remote server 1102 may be configured to set the apriori unknown Bernoulli parameter $\mu = 0.3$, which implies that the region may be uninteresting. The sample mean 1418, as expected, may converge to $\mu$ as the number of samples increases. However, the sample mean on its own may be an unreliable estimator of whether the region may be interesting as evidenced in FIG. 14A. It may be noted that the UCB crosses the threshold $\theta$ at 1420, but the remote server 1102 may be configured to declare the region as uninteresting early after the UCB crosses the corrected threshold $\theta + \in$ at 1422 to achieve probabilistic guarantees of performance.

In another embodiment, the remote server 1102 may be configured to use the Hoeffding's inequality to generate a separate set of upper and lower confidence bounds. In another embodiment, to ensure the application of the bandit algorithm, the remote server 1102 may require that the set of search agents 116 execute each feasible path as a round trip. This ensures that the distribution of the search agents at each charging station remains unchanged.

Figure 15:
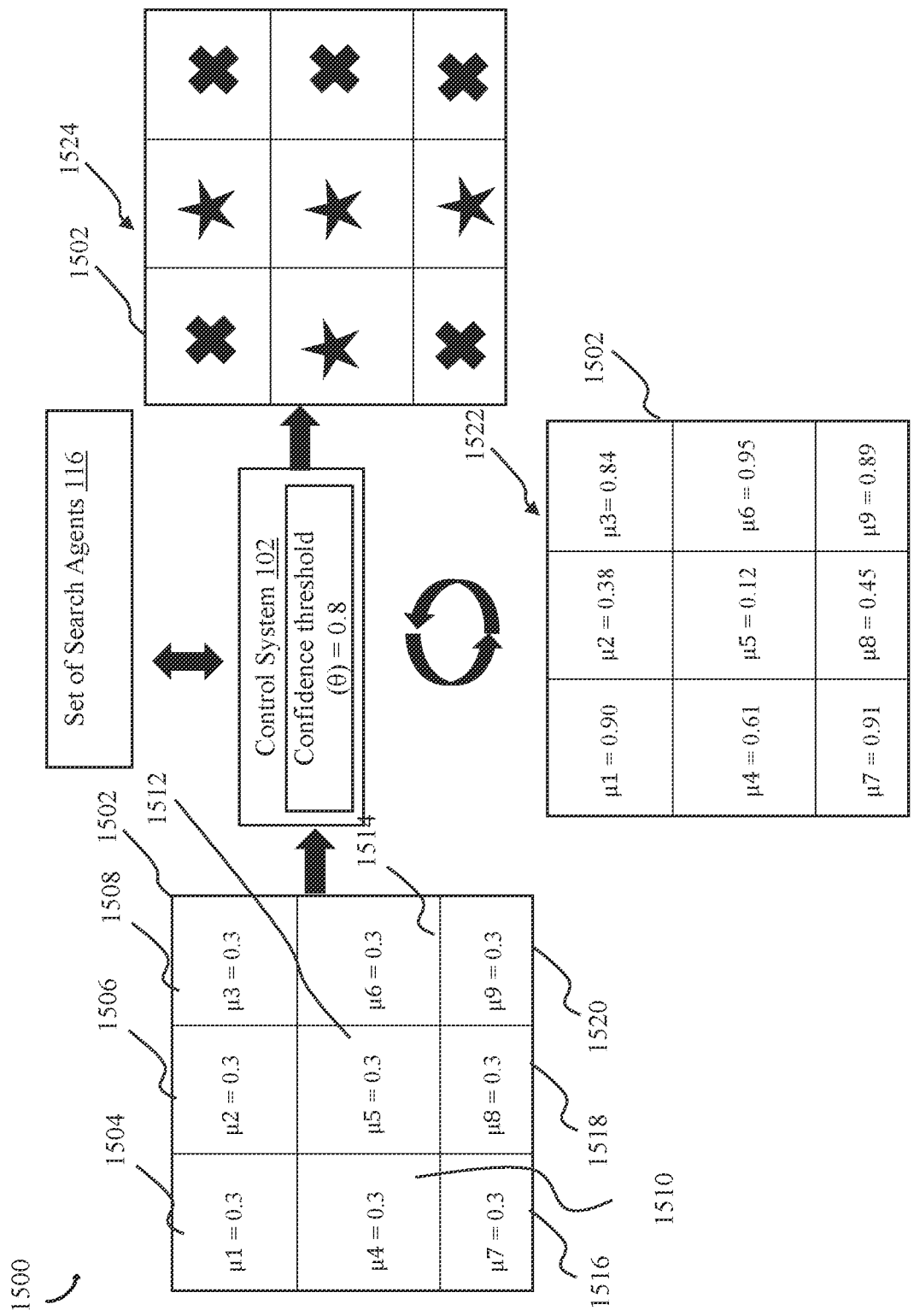
FIG. 15 illustrates a diagram of an exemplar scenario for classifying the set of regions in the search environment, in accordance with an embodiment of the disclosure.

FIG. 15 depicts a diagram to illustrate an exemplary scenario for classifying the set of regions in the search environment, in accordance with an embodiment of the disclosure. FIG. 15 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, FIG. 10, FIG. 11, FIG. 12, FIG. 13, FIG. 14A, and FIG. 14B. With reference to FIG. 15, there is shown an exemplary scenario 1500. The exemplary scenario 1500 may include the control system 102, a search environment 1502 which may be portioned into a set of regions. The set of regions may include a first region 1504, a second region 1506, a third region 1508, a fourth region 1510, a fifth region 1512, a sixth region 1514, a seventh region 1516, an eighth region 1518, and a ninth region 1520.

In an embodiment, the control system 102 may assign a value of 0.3 to the Bernoulli parameter (μ) associated with each of the set of regions as described in FIG. 11. The control system may command the set of search agents 116 to collect measurements iteratively. With each measurement, the control system 102 may be configured to update the value of the Bernoulli parameter (μ) associated with each of the set of regions. An intermediate stage 1522 of the search environment with updated Bernoulli parameter (μ) of each region is shown in FIG. 15. For example, the value of the Bernoulli parameter ($μ_1$) associated with the first region 1504 may be updated from the initialized value of 0.3 to 0.8.

The control system 102 may iteratively perform the MMBS method until each region of the set of regions is classified. To classify each region, the control system 102 may compare the Bernoulli parameter (μ) associated with each of the set of regions with the confidence threshold (θ) that may be set to 0.8, as described in FIG. 11. The control system 102 may further classify each region of the set of regions based on the classification.

With reference to FIG. 15, there is further shown a final stage 1524 when each of the set of regions is classified as the interesting region or the uninteresting region. The interesting regions may be marked with a star symbol whereas the uninteresting regions may be marked with a cross symbol. Specifically, the second region 1506, the fourth region 1510, the fifth region 1512, and the eighth region 1518 may be classified as the interesting regions whereas the others are classified as uninteresting regions.

Figure 16:
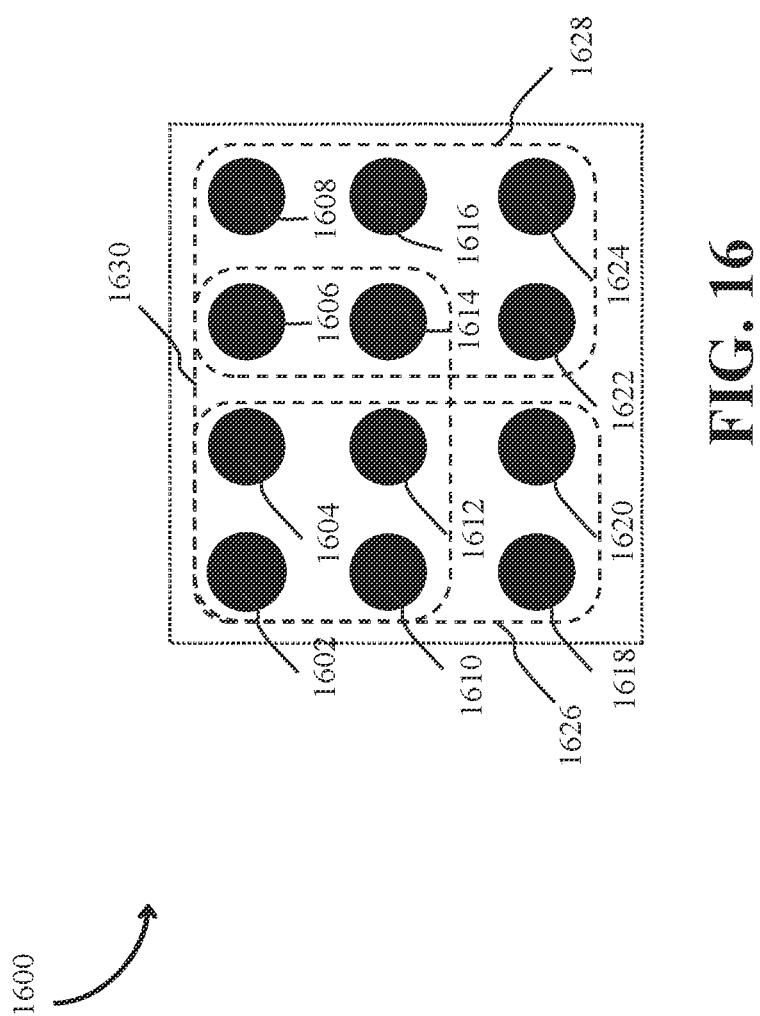
FIG. 16 illustrates an exemplar application of a multi-level multi-arm bandit search (MMBS) method, in accordance with an embodiment of the disclosure.

FIG. 16 depicts a diagram to illustrate a difference between an application of the multi-arm bandit search method and a multi-level multi-arm bandit search (MMBS) method, in accordance with an embodiment of the disclosure. FIG. 16 is explained in conjunction with elements from FIG. 1A, FIG. 1B, FIG. 2A, FIG. 2B, FIG. 3, FIG. 4, FIG. 5, FIG. 6A, FIG. 6B, FIG. 6C, FIG. 6D, FIG. 7A, FIG. 7B, FIG. 8, FIG. 9, FIG. 10, FIG. 11, FIG. 12, FIG. 13, FIG. 14A, FIG. 14B and FIG. 15. With reference to FIG. 16, there is shown a search environment 1600.

Specifically, it may be assumed that 1602 to 1624 may be a set of choices corresponding to the regions that may be available to a multi-arm bandit search method (algorithm). In accordance with an embodiment of the present disclosure, such choices may correspond to the set of regions that may have to be classified by the set of search agents 1106 based on their spatial proximity, and the remote server 1102 may decide the region to visit at every decision epoch.

Traditional multi-arm bandit search methods may assume that the execution of a choice does not affect the choice at the next decision epoch. For example, the traditional multi-arm bandit algorithm may assume that choice 1624 may be executed in the next time step after choosing 1602. However, in a search problem using mobile sensors with dynamics like the set of search agents 106, it may be physically impossible to reach 1624 after visiting 1602 before the next decision epoch. Ignoring such constraints arising from the dynamics of the mobile sensors may result in suboptimal decision-making.

In some embodiments of the present disclosure, it may be realized that the choices may be grouped together into groups 1626, 1628, and 1630 such that no choice may be left out. According to an embodiment of the present disclosure, the above-mentioned choices may correspond to a set of paths that may pass through a sequence of regions and may be physically admissible to be executed by the search team. Instead of deciding which region 1602 to 1624 to visit, the remote server 1102 may choose which path 1626, 1628, and/or 1630 to visit. However, the decision to declare if any region from 1602 to 1624 may be classified as interesting or uninteresting may be still performed at the region level by the remote server 1102.

Figure 17:
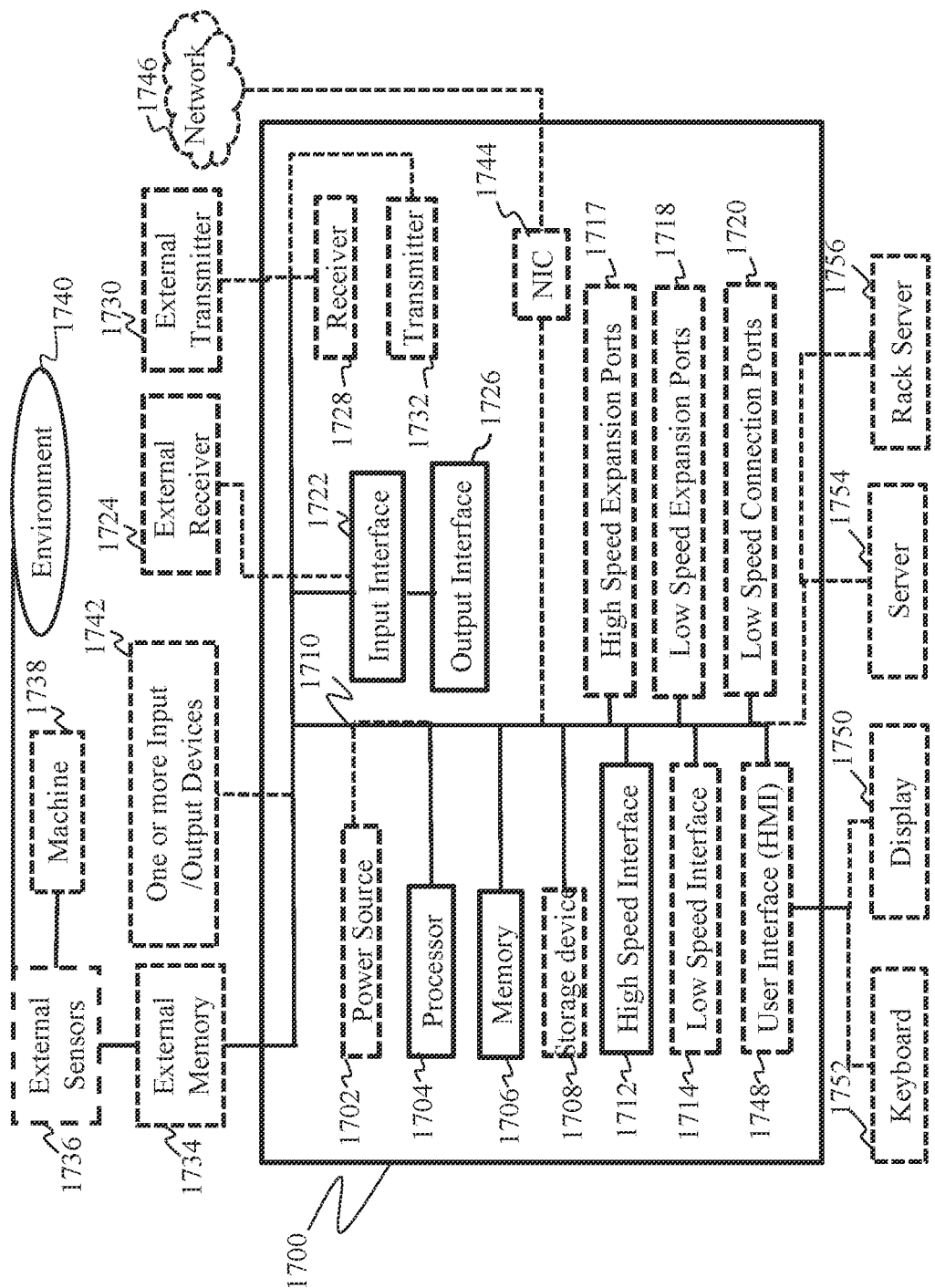
FIG. 17 illustrates a schematic diagram of a computing device that may be used for implementing the control system or the remote server, in accordance with an embodiment of the disclosure.

FIG. 17 shows a schematic diagram of a computing device that may be used for implementing the control system 102 or the remote server 110, in accordance with an embodiment of the disclosure. The computing device 1700 includes a power source 1702, a processor 1704, a memory 1706, and a storage device 1708, all connected to a bus 1710. Further, a high-speed interface 1712, a low-speed interface 1714, high-speed expansion ports 1716, and low-speed connection ports 1718, may be connected to the bus 1710. In addition, a low-speed expansion port 1720 may be in connection with the bus 1710. Further, an input interface 1722 may be connected via the bus 1710 to an external receiver 1724 and an output interface 1726. A receiver 1728 may be connected to an external transmitter 1730 and a transmitter 1732 via the bus 1710. Also connected to the bus 1710 may be an external memory 1734, external sensors 1736, machine(s) 1738, and an environment 1740. Further, one or more external input/output devices 1742 may be connected to the bus 1710. A network interface controller (NIC) 1744 may be adapted to connect through the bus 1710 to a network 1746, wherein data or other data, among other things, may be rendered on a third-party display device, third-party imaging device, and/or third-party printing device outside of the computing device 1700.

The memory 1706 may store instructions that are executable by the computing device 1700 and any data that may be utilized by the methods and systems of the present disclosure. The memory 1706 may include random access memory (RAM), read-only memory (ROM), flash memory, or any other suitable memory systems. The memory 1706 may be a volatile memory unit or units, and/or a non-volatile memory unit or units. The memory 1706 may also be another form of computer-readable medium, such as a magnetic or optical disk.

The storage device 1708 may be adapted to store supplementary data and/or software modules used by the computer device 1700. The storage device 1708 may include a hard drive, an optical drive, a thumb-drive, an array of drives, or any combination thereof. Further, the storage device 1708 may contain a computer-readable medium, such as a floppy disk device, a hard disk device, an optical disk device, or a tape device, a flash memory or other similar solid-state memory device, or an array of devices, including devices in a storage area network or other configurations. Instructions may be stored in an information carrier. The instructions, when executed by one or more processing devices (for example, the processor 1704), perform one or more methods, such as those described above.

The computing device 1700 may be linked through the bus 1710, optionally, to a display interface or user Interface (HMI) 1748 adapted to connect the computing device 1700 to a display 1750 and a keyboard 1752, wherein the display 1750 may include a computer monitor, camera, television, projector, or mobile device, among others. In some implementations, the computer device 1700 may include a printer interface to connect to a printing device, wherein the printing device may include a liquid inkjet printer, solid ink printer, large-scale commercial printer, thermal printer, UV printer, or dye-sublimation printer, among others.

The high-speed interface 1712 manages bandwidth-intensive operations for the computing device 1700, while the low-speed interface 1714 manages lower bandwidth-intensive operations. Such allocation of functions may be an example only. In some implementations, the high-speed interface 1712 may be coupled to the memory 1706, the user interface (HMI) 1748, and to the keyboard 1752, and the display 1750 (e.g., through a graphics processor or accelerator), and to the high-speed expansion ports 1716, which may accept various expansion cards via the bus 1710. In an implementation, the low-speed interface 1714 may be coupled to the storage device 1708 and the low-speed expansion ports 1718, via the bus 1710. The low-speed expansion ports 1718, which may include various communication ports (e.g., USB, Bluetooth, Ethernet, wireless Ethernet) may be coupled to the one or more input/output devices 1742. The computing device 1700 may be connected to a server 1754 and a rack server 1756. The computing device 1700 may be implemented in several different forms. For example, the computing device 1700 may be implemented as part of the rack server 1756.

Many modifications and other embodiments of the disclosure set forth herein will come to mind to one skilled in the art to which these disclosures pertain having the benefit of the teachings presented in the foregoing descriptions and the associated drawings. It is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method implemented by one of a control system or a remote server for controlling a movement of at least a first search agent of a set of search agents in a search environment partitioned into a set of regions and classifying each region of the set of regions based on measurements collected by the first search agent, comprising:

an iterative execution of a multi-level multi-arm bandit search (MMBS) method until a termination condition is met, wherein the MMBS method specifies a first set of instructions for individual probabilistic classifications of each region of the set of regions based on the measurements associated with the corresponding region, and a second set of instructions for visiting, by the set of search agents, each path of a set of paths formed from the set of regions based on comparing aggregations of the probabilistic classifications of different paths, wherein each path of the set of paths comprises at least two regions of the search environment, and wherein the iterative execution of MMBS comprises:

collecting confidence bounds of the probabilistic classification of at least one region within at least one path of the set of paths;

comparing aggregations of the confidence bounds of the probabilistic classifications of each path of the set of paths based on the collected confidence bounds;

selecting a first path of the set of paths to be visited by the first search agent based on the comparison;

commanding, via a transceiver configured to exchange data with the set of search agents over a wired or wireless communication channel, the first search agent to visit the selected first path and to collect measurements associated with each region within the selected first path;

updating the confidence bounds of the probabilistic classifications of each region within the selected first path based on the measurements associated with the corresponding regions; and controlling the movement of at least the first search agent of a set of search agents.

2. A control system to control a movement of at least a first search agent of a set of search agents in a search environment partitioned into a set of regions and to classify each region of the set of regions based on measurements collected by the first search agent, comprising:

a transceiver configured to exchange data with the set of search agents over a wired or wireless communication channel;

a memory configured to store executable instructions specifying an operation of a multi-level multi-arm bandit search (MMBS) method, wherein the MMBS method specifies a first set of instructions for individual probabilistic classifications of each region of the set of regions based on the measurements associated with the corresponding region, and a second set of instructions for visiting, by the set of search agents, each path of a set of paths formed from the set of regions based on comparing aggregations of the probabilistic classifications of each path of the set of paths, wherein each path of the set of paths comprises at least two regions of the search environment; and a processor coupled with the executable instructions, when executed by the processor, causes an iterative execution of the MMBS method until a termination condition is met, wherein an iteration of the MMBS method causes the control system to:

collect confidence bounds of the probabilistic classification of at least one region within at least one path of the set of paths;

compare aggregations of the confidence bounds of the probabilistic classifications of each path of the set of paths based on the collected confidence bounds;

select a first path of the set of paths to be visited by the first search agent based on the comparison;

command, via the transceiver, the first search agent to visit the selected first path and to collect measurements associated with each region within the selected first path;

update the confidence bounds of the probabilistic classifications of each region within the selected first path based on the measurements associated with the corresponding regions; and control the movement of at least the first search agent of the set of search agents.

3. The control system of claim 2, wherein the processor is further configured to:

receive a set of user inputs associated with generation of the set of paths to cover the search environment; and generate the set of paths to cover the search environment based on the received set of user inputs.

4. The control system of claim 3, wherein a first user input of the set of user inputs corresponds to a path length for each path of the set of paths, and wherein the path length for each path corresponds to a maximum number of regions in each path that maybe traversed by at least one search agent of the set of search agents while satisfying its physical constraints, wherein the physical constraints can be due to the motion constraints of the search agents and limited on-board energy available for the search agents.

5. The control system of claim 3, wherein each path of the set of paths starts or ends at a pre-designated region of one or more pre-designated regions, and wherein at least one pre-designated region is located inside the search environment, and at least one pre-designated region is located outside of the search environment.

6. The control system of claim 5, wherein each of the one or more pre-designated regions corresponds to one of: an energy refueling station, a calibration station, a service station, or a docking station, and wherein each search agent of the set of search agents corresponds to one of: an autonomous vehicle, a mobile robot, an aerial drone, a ground vehicle, an aerial vehicle, a water surface vehicle, or an underwater vehicle.

7. The control system of claim 3, wherein the processor is further configured to generate the set of paths using a graph-based multi-agent path planning process that shrinks a first set of paths into the set of the paths covering the search environment subjected to one or more path constraints.

8. The control system of claim 7, wherein to perform the graph-based multi-agent path planning process, the processor is configured to:
construct, for each region of the set of regions, a shortest path table comprising a minimum number of steps required to reach any one of the one or more pre-designated regions in the search environment, where the shortest path table is constructed using one or more graph-based shortest path planning processes;
randomly generate the first set of paths satisfying the one or more path constraints by constructing a sequence of regions starting from a randomly selected pre-designated region from the one or more pre-designated regions in the search environment and executing a hill ascend operation according to the shortest path table for a first half of the path length and further executing a hill descend operation according to the shortest path table for a second half of the path length to reach one of the one or more pre-designated regions; and
select the set of paths from the first set of paths further based on the execution of the hill ascend operation and the hill descend operation.

9. The control system of claim 2, wherein the processor is further configured to:
evaluate, for each path of the set of paths, a pre-determined aggregation function of the values of the confidence bounds of each region within the corresponding path;
sort the evaluation of the pre-determined aggregation function for each of the set of paths in descending order of a function value for each path, wherein the function value is determined based on an application of the pre-determined aggregation function on the confidence bounds of each region in each path of the set of paths; and
select, based on the sorting, at least one path to be visited by the set of search agents, wherein the first path is selected to be visited by the first search agent.

10. The control system of claim 2, wherein the processor is further configured to:
evaluate, confidence bounds of each region in each path of the set of paths, using a neural network that intakes the data collected of each region in the corresponding path and computes an aggregate value of visiting the path;
return an assignment of the set paths to be executed by each search agent of the set search agents based on the evaluation, wherein the first path is assigned to the first search agent; and
select, based on the assignment, at least one path to be visited by the set of search agents, wherein the first path is selected to be visited by the first search agent based on the assignment.

11. The control system of claim 2, wherein the processor is further configured to:
select probabilistically between different selecting criteria including a most-promising path criterion and a minimal-movement criterion; and
select, based on the selected criterion, at least one path to be visited by the set of search agents, wherein the first path is selected to be visited by the first search agent.

12. The control system of claim 11, wherein the probability of selection is a biased probability.

13. The control system of claim 12, wherein the selection of at least one path to be visited by the set of search agents is performed over multiple control steps dependent on a number of the regions in the search environment, and wherein a bias of the biased probability varies between at least some control steps.

14. The control system of claim 13, wherein the processor is further configured to update the bias based on the likelihood of interest at different regions of the set of regions in the search environment.

15. The control system of claim 14, wherein the processor is further configured to use a neural network trained that takes as input the set of regions, set of paths, data collected at each region to produce the biased probability.

16. The control system of claim 2, wherein the processor is further configured to:
select the first path and a second path from the set of paths based on the aggregations of the probabilistic classifications of each of the set of paths; and
control the movement of the first search agent and a second search agent of the set of search agents concurrently on the selected first path and the second path to take measurements associated with the corresponding regions within the first path and the second path.

17. The control system of claim 2, wherein to update the confidence bounds of the probabilistic classifications of a first region within the selected first path, the processor is configured to
receive a pre-determined number of measurements associated with the first region and collected by at least the first search agent; and
update the confidence bounds of the probabilistic classifications of the first region based on the pre-determined number of measurements using at least one concentration inequality.

18. The control system of claim 2, wherein to update the confidence bounds of the probabilistic classifications of a first region within the selected first path, the processor is configured to:
transmit, via the transceiver, to at least the first search agent: a current value of the confidence bounds of the probabilistic classifications of the first region, a third set of instructions for taking a pre-determined number of measurements associated with the first region, and a fourth set of instructions for updating the current values of the confidence bounds of the probabilistic classifications of the first region; and receive, via the transceiver, the updated confidence bounds of the probabilistic classifications of the first region from at least the first search agent.

19. The control system of claim 2, wherein the processor is further configured to:

compare the updated confidence bounds of a first region within the selected first path with a confidence threshold;

classify the first region within the selected first path based on the comparison; and update the first path of the set of paths to prune the first region from the first path based on the classification of the first region.

20. The control system of claim 2, wherein each region of the set of regions is classified with a first label or a second label, and wherein the termination condition is met when each region of the set of regions is classified with one of the first label or the second label.

\* \* \* \* \*